(12) United States Patent
Moreman

(10) Patent No.: US 7,379,384 B1
(45) Date of Patent: May 27, 2008

(54) ECHO SCOPE

(76) Inventor: Douglas Moreman, 8154 Rainbow Dr., Baton Rouge, LA (US) 70809

( * ) Notice: Subject to any disclaimer, the term of this patent is extended or adjusted under 35 U.S.C. 154(b) by 0 days.

(21) Appl. No.: 11/562,412

(22) Filed: Nov. 21, 2006

Related U.S. Application Data

(60) Provisional application No. 60/737,951, filed on Nov. 21, 2005.

(51) Int. Cl.
*G03H 3/00* (2006.01)

(52) U.S. Cl. .......................................... 367/8

(58) Field of Classification Search ................ 367/8; 73/603
See application file for complete search history.

(56) References Cited

U.S. PATENT DOCUMENTS

| | | | | |
|---|---|---|---|---|
| 4,088,979 A * | 5/1978 | Jones et al. | ..................... | 367/8 |
| 4,198,705 A * | 4/1980 | Massa | ........................ | 367/126 |
| 4,209,853 A * | 6/1980 | Hyatt | ............................. | 367/8 |
| 4,800,540 A * | 1/1989 | Annala | ........................ | 367/87 |
| 4,893,289 A * | 1/1990 | Greenwood et al. | ........ | 367/136 |
| 5,090,245 A * | 2/1992 | Anderson | ..................... | 73/625 |
| 5,184,330 A * | 2/1993 | Adams et al. | .............. | 367/111 |
| 5,537,380 A * | 7/1996 | Sprankle et al. | ............ | 367/111 |
| 5,729,507 A * | 3/1998 | Massa et al. | ............... | 367/124 |
| 2005/0088435 A1* | 4/2005 | Geng | .......................... | 345/419 |

* cited by examiner

*Primary Examiner*—Dan Pihulic
(74) *Attorney, Agent, or Firm*—Roy, Kiessel, Keegan & Denico; Neil J. Coig

(57) ABSTRACT

The present invention is a new technology for producing images which uses echoes of a single brief signal, or "click". A "click" is transduced by multiple sensors and then digitally sampled. Digitized signals are computer analyzed for fine details of each rise and fall. The signal details, based on individual instants of time, from the various sensors of a set are referenced to points in space, producing 3D models of echoing objects from set-based entities of information. Mathematical methods of correlation and of Fourier analysis are thus avoided. Many of the methods may also apply to passive sonar as well as multiple other types of waves.

8 Claims, 5 Drawing Sheets

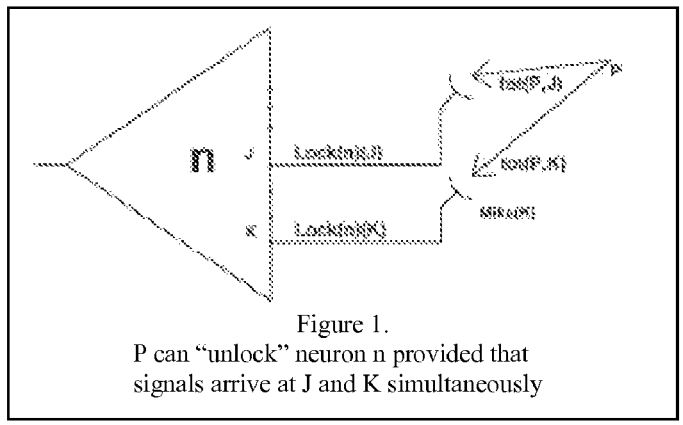

Figure 1.
P can "unlock" neuron n provided that
signals arrive at J and K simultaneously

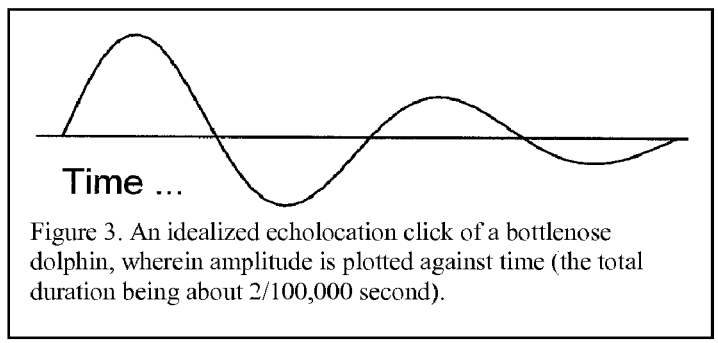

Figure 3. An idealized echolocation click of a bottlenose dolphin, wherein amplitude is plotted against time (the total duration being about 2/100,000 second).

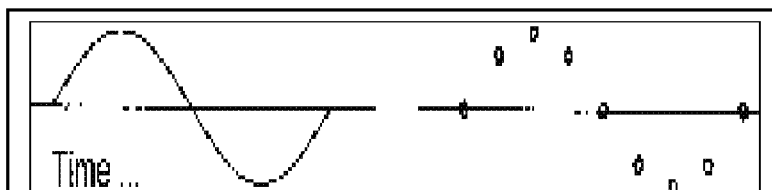

Figure 4a          Figure 4b
a. A simple echo of a simple, single-cycle click.
b. A digitization of a simple echo.

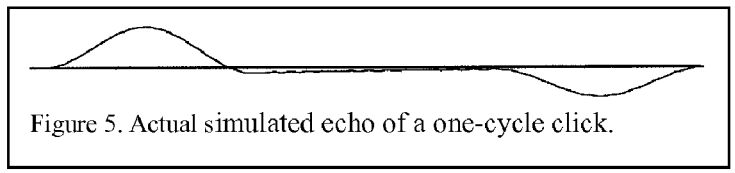

Figure 5. Actual simulated echo of a one-cycle click.

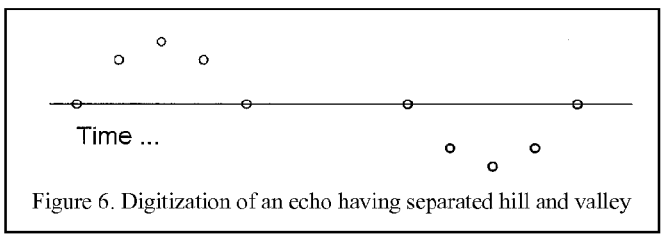
Figure 6. Digitization of an echo having separated hill and valley
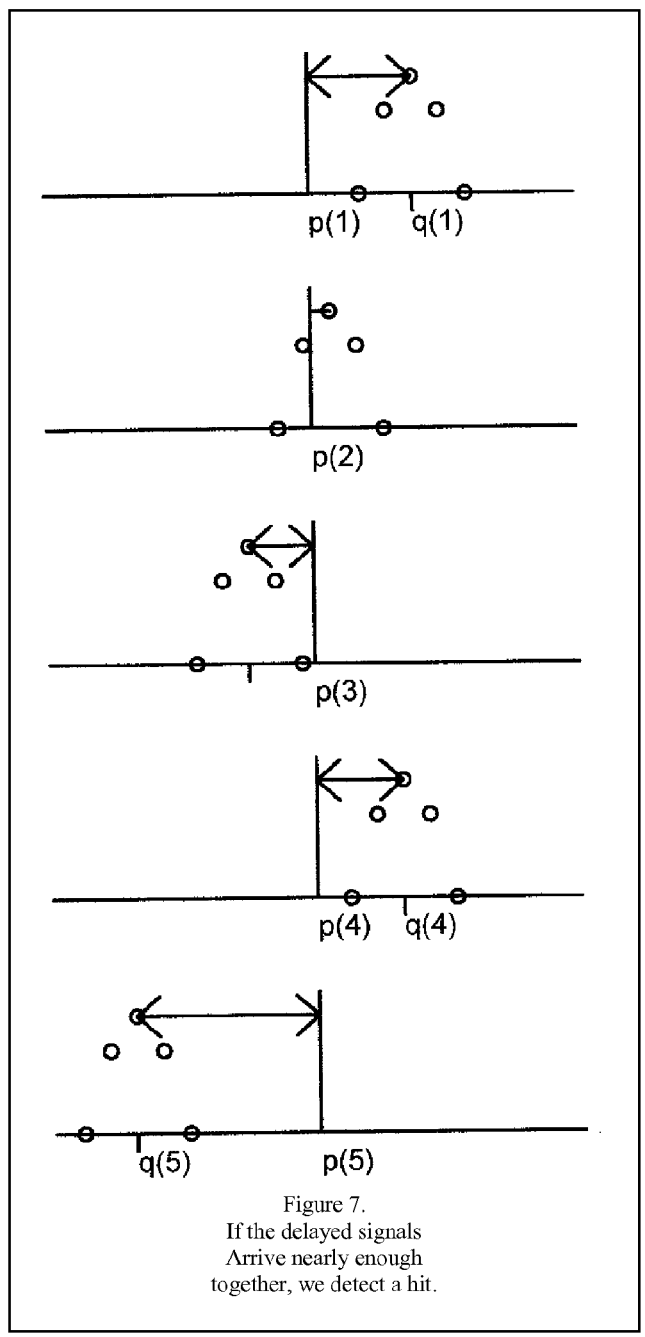
Figure 7.
If the delayed signals
Arrive nearly enough
together, we detect a hit.

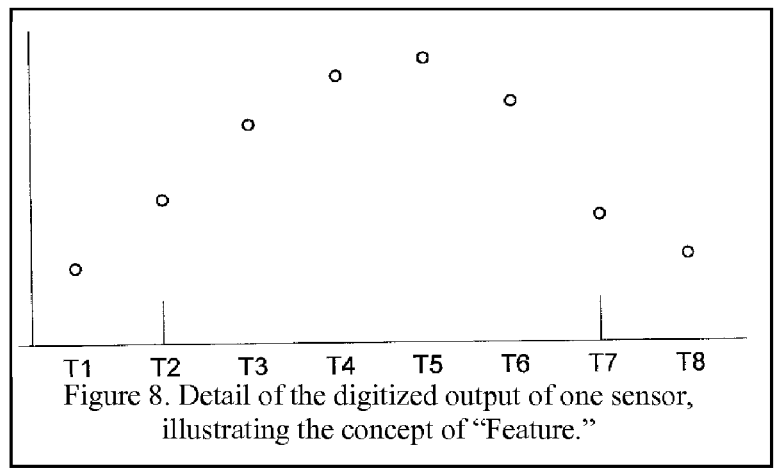
Figure 8. Detail of the digitized output of one sensor, illustrating the concept of "Feature."
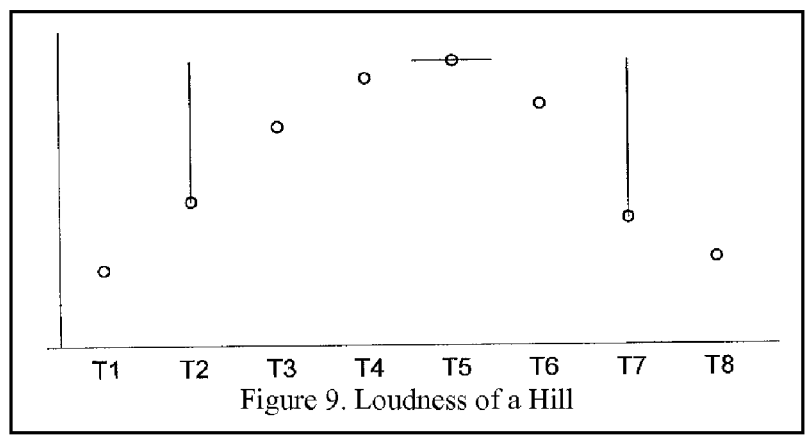
Figure 9. Loudness of a Hill
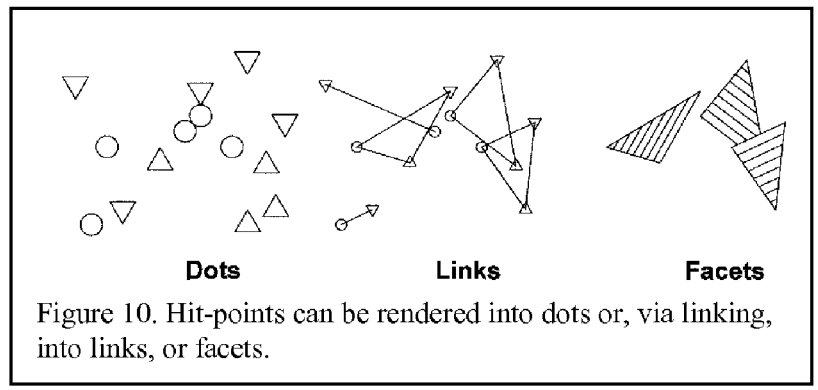
Figure 10. Hit-points can be rendered into dots or, via linking, into links, or facets.

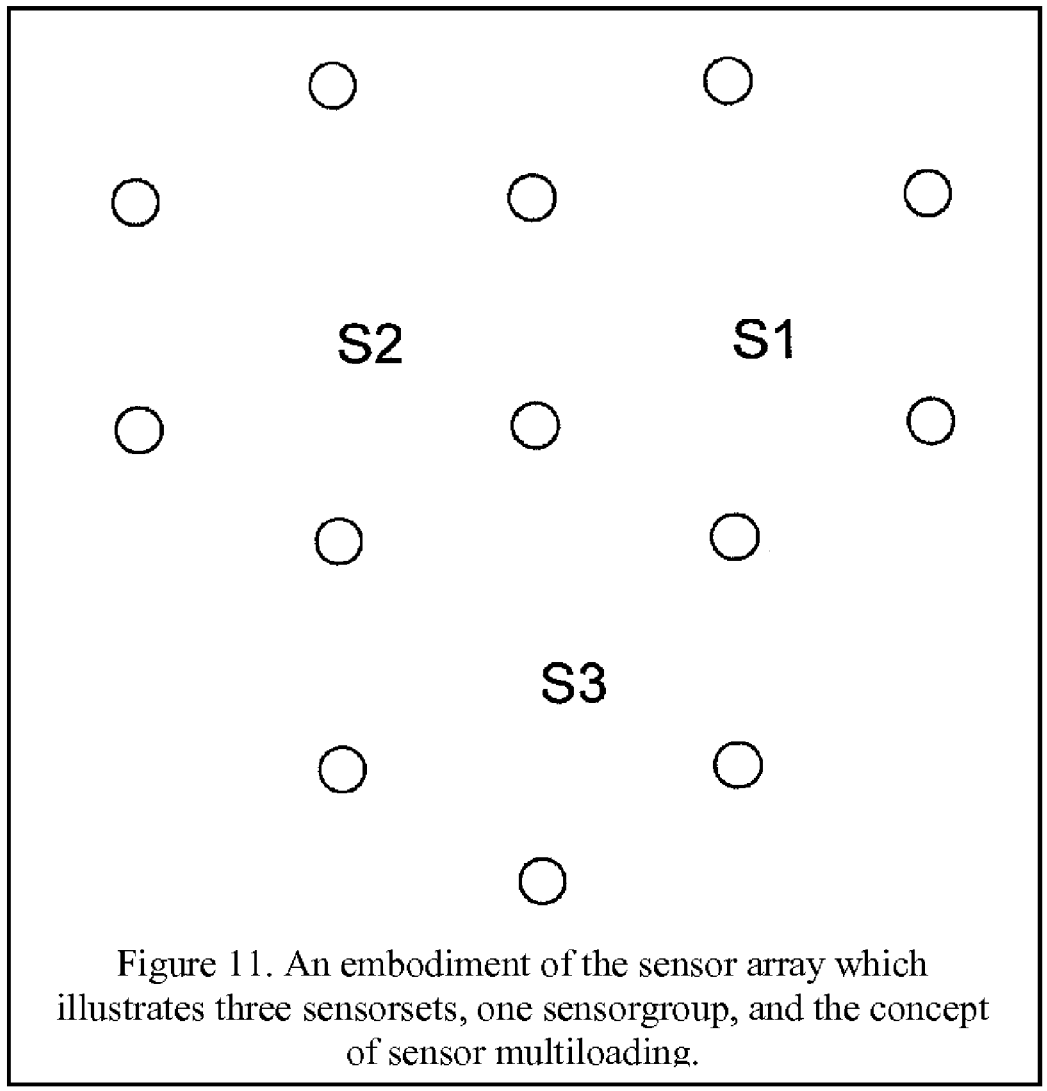
Figure 11. An embodiment of the sensor array which illustrates three sensorsets, one sensorgroup, and the concept of sensor multiloading.

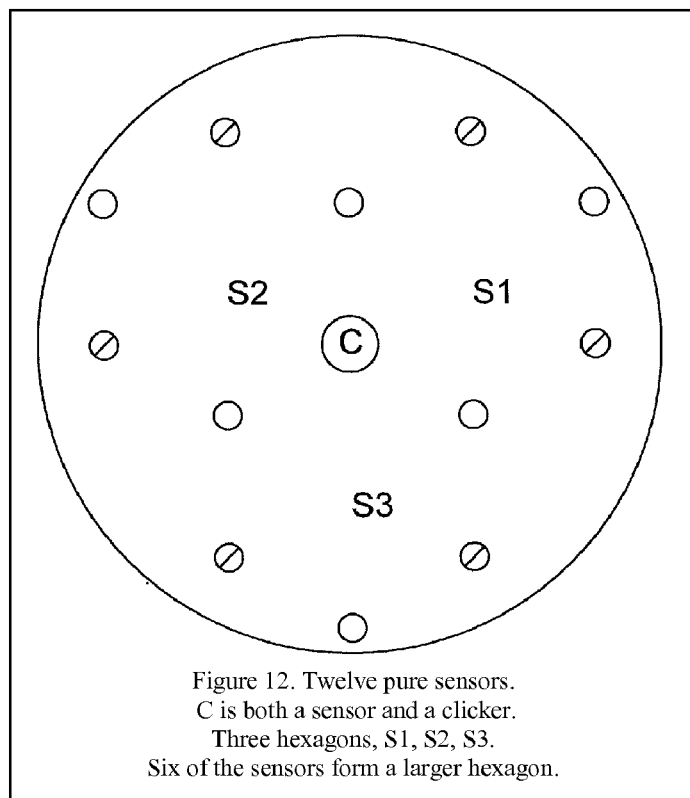
Figure 12. Twelve pure sensors.
C is both a sensor and a clicker.
Three hexagons, S1, S2, S3.
Six of the sensors form a larger hexagon.
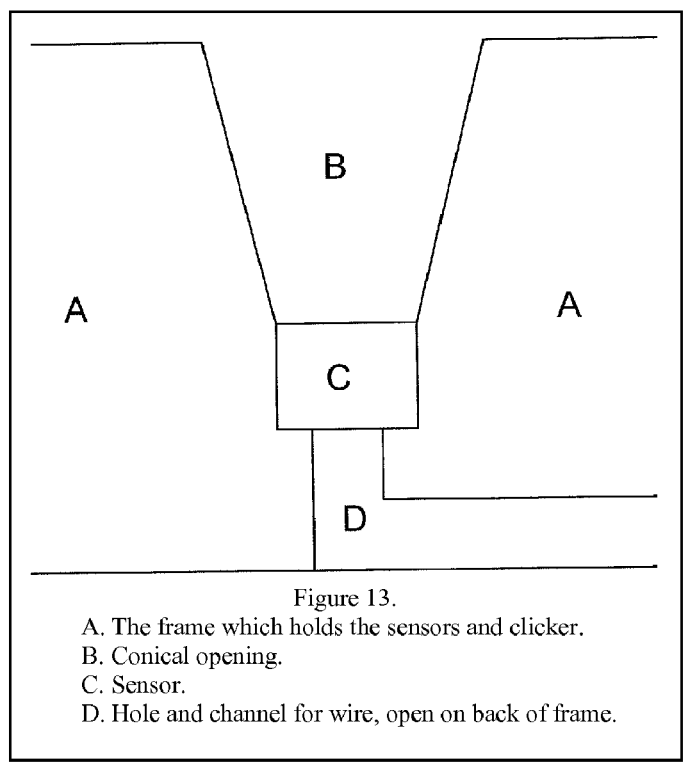
Figure 13.
A. The frame which holds the sensors and clicker.
B. Conical opening.
C. Sensor.
D. Hole and channel for wire, open on back of frame.

ECHO SCOPE

CONTINUATION HISTORY

This application is a continuation of U.S. Patent Application 60/737,951, filed on Nov. 21, 2005, which is hereby incorporated by reference in its entirety.

BACKGROUND OF THE INVENTION

The present invention relates to a method and corresponding apparatus for detecting objects via echoes. The present invention is a process, inspired by dolphins, for making images from echoes. The process is designed to be implemented in computer software but also suggests a compatible geometric arrangement of sensors which may be used in any number of applications. The process, with appropriate adjustments in sensor geometry, can image either telescopically or microscopically.

Most commercial products known in the art for making images from echoes rely on echoes produced by transmitted signals, or "clicks," each of which travels to an echoing object down a path which is narrow in at least one of the two-dimensions of its cross sections; so, the path is either a narrow cone or a narrow fan (e.g. in sonar, an angle of one degree). The angle of a beam and the time of arrival of an echo combine to produce a point in an image. The full image might, thus, require a large multitude of transmitted clicks. By contrast, the present invention utilizes a computer and can make a 3-dimensional image-model from as few as one brief click which can have a broad beam (e.g. can be a cone whose angle of opening is approximately 15 degrees). The angle of the beam can be greater, as there is more computing power, or smaller should the expected environment have more noise.

Another distinguishing aspect of this work is that it uses time-instant based, rather than time-interval based, diffuse methods of analyzing signals and uses these instance-based methods in conjunction with sets of sensors (herein called "scopions") which output sets of signals. Properties of the sets of signals are created, which properties relate to specific points in space.

Prior art (notably in radar) includes instances of a single-transmitter combined with a set of receivers. The new art here is distinguished by how a set of signals from a set of receivers is processed. Prior art uses various forms of time-interval-based, or "diffuse," methods such as found in Fourier analysis and in statistics, correlation for example, while, such methods are absent here.

U.S. Pat. No. 5,090,245 describes a device which uses a single, broad beam insonifying signal and a multitude of sensors of "ultrasonic" echoes. The signal processing described or referred to in that patent seems to be "diffuse" and not at all of the time-instant form claimed herein. Further, that patent seems to totally miss the possibility of imaging via non-ultrasonic sound. Methods claimed herein can be used up to a range of several miles or more to image large, distant objects via a click whose "period" corresponds to "infrasound," a sound frequency too low for humans to hear.

A ubiquitous thread in this Description is time-constraint. Few applications would be worth the amount of computer time which would be demanded by unlimited application of all the methods claimed herein. This set of methods is sufficiently rich that they can be selected among, some being emphasized more than others, as time and target-situation allow and demand.

Another thread is phantom reduction. The new methods here involve separating "real" associations from the false among signals from several sensors. The false associations might easily greatly outnumber the real. The present invention may also utilize code, exemplifying the methods claimed herein, which rapidly finds most true associations while avoiding, or detecting and eliminating, most phantoms.

OBJECTS OF THE INVENTION

One object of the invention is to provide a method for improving information extracted from echoes.

Another object of this invention is to provide a method for improving the utility of sonar and other waves.

Yet another object of this invention is to provide a method for increasing the ease of use of sonar and other waves.

Still another object of this invention is to provide a method of providing sonar which utilizes multiple transducers.

Other objects and advantages of this invention shall become apparent from the ensuing descriptions of the invention.

SUMMARY OF THE INVENTION

The present invention is a new technology for producing images which uses echoes of a single brief signal, or "click". A "click" is transduced by multiple sensors and then digitally sampled. Digitized signals are computer analyzed for fine details of each rise and fall. The signal details, based on individual instants of time, from the various sensors of a set are referenced to points in space, producing 3D models of echoing objects from set-based entities of information. Mathematical methods of correlation and of Fourier analysis are thus avoided. Many of the methods may also apply to passive sonar, or wave energy, as well as other types of waves.

BRIEF DESCRIPTION OF THE DRAWINGS

The accompanying drawings illustrate an embodiment of this invention. However, it is to be understood that this embodiment is intended to be neither exhaustive, nor limiting of the invention. They are but examples of some of the forms in which the invention may be practiced.

FIG. 1 is a diagram illustrating a click being received.

FIG. 2 is omitted.

FIG. 3 is a diagram showing an idealized echolocation click.

FIG. 4 shows a simple echo of a single-cycle click.

FIG. 5 is a simulated echo of a one-cycle click showing separation of parts.

FIG. 6 shows features in a digitization of an echo.

FIG. 7 is a comparison of delayed signals.

FIG. 8 illustrates details of the concept of Feature.

FIG. 9 is a diagram of the loudness of a Hill.

FIG. 10 is a diagram illustrating hit-point renderings.

FIG. 11 Shows that a sensor can be in two scopions of an array.

FIG. 12 Shows a twelve-sensor array and clicker mounted on a disk.

FIG. 13 is a side-view diagram showing a sample apparatus for the present invention.

DETAILED DESCRIPTION OF EXEMPLARY EMBODIMENTS

Without any intent to limit the scope of this invention, reference is made to the figures in describing the various embodiments of the invention. FIGS. 1-13 show various aspects of exemplary embodiments of, and related information pertaining to, the present invention.

The exemplary embodiment disclosed here is as an imager of fish, as in a very capable "fish-finder" or device for locating aquatic life. There exist several other possible applications of sonarscopically (a term coined herein) produced image-models than imaging, the main example disclosed herein of imaging fish. For example, an echoscope (or a "sonarscope") adapted to fish can be programmed to "recognize" that a specific fish is in the image-model, to estimate dimensions of that fish, and to make a statistically reasonable guess as to the species of that fish. Thus, without ever producing an image, the image-models of such a sonarscope can contribute to a study of fish populations, both in number and location. Imaging can be accomplished by measuring passive sonar, or wave energy, which would be the energy given off by an object as it moves through a medium, such as air, water, gas, light or any another medium. Other examples of this versatility will become apparent upon review of the information below.

Sound is transmitted in the form of waves of energy in some medium. Presented herein is the example of the pressure waves of sound in water. These principles can be translated directly to other waves, notably to the electromagnetic waves of, for example, radar, wherein the "speed of sound" could be substituted with the "speed of light."

This inventor has speculated how the brain of a dolphin might create mental images from echoes. At the start of the imaging process there are "modeling neurons" each of which represents, somehow, a point in space in front of the dolphin. Disclosed herein is a foundation for software which simulates the inventor's model for the echolocating activity of a dolphin's brain.

It seems likely that dolphins do not solely use "ears" for input devices to their sonar-imaging brain, and that sound is instead picked up somehow by the jaw or other portions of the animal's anatomy. Perhaps the lower jaw has units, each of which acts as an acoustic pickup and the signals from these units enter the brain separately, either through separate neurons, bypassing the cochlea, or through multiplexing through the cochlea, by way of a set of acoustically sensitive areas, or "sensors" in the present invention.

Sets of such sensors, the output of which is used jointly to compute points of space, are herein called "scopions," but sometimes are referred to by "mikesets" and "sensorsets." For the easing of understanding which may come from being more specific, imagine an arrangement of "acoustic pickups" (also known herein as "microphones" or "mikes," though they could be hydrophones, or ears, or optical sensors, radar antennae). The mikes are organized behaviorally, into sets called "mikesets" and these sets, into mikegroups or "scopiongroups."

Analogy of Lock and Key

In explaining the invention, it is beneficial to begin with just one mikeset, or scopion. The system of methods introduced here will be referred to as "sonarscopy." The word "sonarscopic" is coined here and used here to indicate the inventive aspect of this invention, exemplified by, but not restricted to, "Features" of time-series of signals and various "signal-crossing" entities. "Echoscopy" and "echoscopic" mean, redundantly, the same respectively as sonarscopy and sonarscopic.

Let Speed denote the speed of waves in the medium.

Consider for now a single scopion S. Let N denote the number of elements of S. The integers from 1 to N are called mike-numbers. The N elements of S are denoted by Mike (M) for every mike-number M.

For every mike-number M and point P in insonified space, let PtToMike(P,M)=distance(P, Mike(M))/Speed, the Time of Travel from P to Mike(M).

For every modeling neuron n, [see FIG. 1], then, 1) by the lock of n, denoted by Lock(n), is meant the N-term sequence such that for every mike-number M, Lock(n)(M) is the time of transit of sound from Mike(M) to neuron n (e.g., think of nerve from ear to neuron), 2) by a key for n is meant an N-term number-sequence, ky, such that
if J and K are any two mike-numbers then $$\text{Lock}(n)(J)+ky(J)=\text{Lock}(n)(K)+ky(K),$$

3) the statement that a point P is a keypoint of n means that the sequence k defined by k(M)=PtToMike(P,M) for every mike-number M, is a key for n. A sound emanating from P can "unlock" or "fire" neuron n.

In the case of the dolphin referenced above, "Mike(M)" can be given a biological interpretation: such as previously mentioned, a bone structure such as a tooth in the lower jaw, or a neuron in the skin or in the jaw itself. This lends credence to the hypothesis that the neurons for echolocation and/or the cochlea in the average ear evolved from neurons in the jaw for touch sensation or for pressure on teeth. The tooth vibrates, in this theory, and stimulates a nerve which sends (bypassing the cochlea) a signal via neuronal branching, to each of perhaps millions of modeling neurons in the brain.

Subsequent decoding, in a brain, is done, via "lock and key alignment," wherein the physical delays Lock(neuron) (acoustic pickup) naturally decode information about echoing objects, as seen in FIG. 1.

Moving to a software example utilizing active rather than passive sonarscopy, the number of mikes in the scopion under discussion will be denoted by NMikes. In this example there is but one "clicker" (or signal emitter) and it emits a click whose echoes are analyzed by a device utilizing such software. The example, at first, consists of one Clicker, one scopion, an integer NMikes and, for every integer M from 1 to NMikes, the acoustic pickup Mike(M), and some echoing points. The Clicker and all mikes are modeled here as single points. Modeled in the software, an abstract Grid is rigidly attached to a sonarscope. Such a grid, as used herein will be called a detection-grid. Such a grid consists of points, called gridpoints, which are more or less evenly spaced in a region, called TargetZone, which, for ease of presentation, is assumed to be conical with vertex on Clicker and down which each click travels. These gridpoints replace modeling neurons in a transition from biological model into a computer. It is further assumed for simplicity that Target-Zone has an axis, ZoneAxis.

The clicker then emits, from time to time, a click, or brief sound modeled as a function of time. Assume that 0 is the time at which the click begins and Click(t) can be thought of as the loudness of the click at the clicker at time t. The concept of toa, time-of-arrival, is defined like this indication in pseudo code:

```
{For each point P, we define
    prePoint(P) = distance(Clicker, P) / Speed, and
    For each mike-number M,
        toa(P,M) = prePoint(P) + PtToMike(P,M)
        'Note: toa is Time Of Arrival
        'relative to time 0 at the clicker.
}
```

For every mike-number M, and for every appropriate time t, the input to Mike(M) is Signal(M,t) which, can be presumed to be roughly proportional to the amplitude of the signal (e.g. to the pressure in the water) at Mike(M). Note that elsewhere in this application, the digitized output of Mike(M) will be referred to as Sig(M,*), the sequence or time-series Sig(M,1), Sig(M,2), . . . , Sig(M,NMikes).

As a real-world example, Bottlenose dolphins also seem to have just one clicker, the forehead. They exhibit remarkable sonar-based abilities. Their clicks have, as shown by the idealization in FIG. 3, roughly speaking, two "cycles." The points of the graph, in that figure, are of the form (t, water-pressure(t)) for times t.

Consider then, for ease of understanding, a simpler click, one having one "cycle" that is similar to a cycle of a pure tone. The duration of the click is expressed in code by the variable, ClicksDuration. The system of sets of pickups and the one (or more) clicker, and our software running in some computer, is referred to as a sonarscope (also known as an "echoscope").

Digitization

There is a rate of sampling SamplesPerClick and, for each mike M, the signal from M is digitized at a steady rate equal to SamplesPerClick samples per the assumed one cycle of the output Click. For purposes of illustration, SamplesPerClick will be 8.

For each mike-number M, then, there are software arrays TimeOf( ) and Sig(M,*) and there is a physical device, an analog-to-digital converter, whose input is Signal(M,t) (though perhaps negligibly delayed) and whose discrete output includes triples of the form (Tick, TimeOf(M,Tick), Sig(M,Tick)), where Sig(M,Tick) represents the number Signal(M,t), where t is a time stored in array TimerOf(M,*) as TimeOf(M,Tick), and the times t are evenly spaced and Tick is incremented as a counter. The times are incremented by the constant dt which is ClicksDuration/SamplesPerClick:. It is also true that SamplesPerSecond=SamplesPerClick/ClicksDuration. In the software, Function TicksOf(time) uses dt to convert a duration into an integral number of ticks.

In some places below, a name will be used with helpful ambiguity. "M" may be regarded as being a mike in one instance and may also denote a mike-number. A signal which is similar enough, in shape, to a Click, is known as a simple echo; and these simple echoes are used for simplicity in illustration.

At each mike, a simple echo might appear as shown in FIG. 4a, where loudness is plotted with respect to time. A possible digitization of that echo is shown in FIG. 4b where points (t,s) are such that t is a tick of time and s is a measure of the output of a sensor. The number s might be a voltage which is nearly enough, for purposes of this example, directly proportional to a sensed quantity (e.g. loudness).

Features

The methods presented here involve analyzing individual "hills" (highs) and "valleys" (lows) of measured echoes. The hills and valleys in actual echoes are distorted from the hills and valleys of the original, emitted, click. Such distortions contain valuable information.

Even noiseless echoes from simple reflectors often do not look exactly like the click which produced them. Sometimes, hill and valley are separated in time, as in FIG. 5. A digitization may appear as in FIG. 6, where SamplesPerClick was 8. That figure also serves to illustrate possiblefeatures of signals.

"Hill" and "Valley," local high and local low, are two examples of features of signals. Also known as Hilltop and Valleybottom, they are the two primary features. An echo of a single cycle click, can have at least 10 kinds of features, one indicated by each dot in FIG. 6—where the fifth feature (from left to right) is, indeed, distinct from the sixth.

There will further be, for each sensor, the variables NFeatures, NHillFeatures, and NValleyFeatures to represent, respectively, the total number of kinds of features, the number of instances of hill-features (see 5 of these in FIG. 6), the number of instances of valley-features.

Under the illustrating assumption that SamplesPerClick is 8, names are given to some of the kinds of features. Numbering them from left to right as (1,2,3,4,5) and (6,7, 8,9,10), they are renamed to get (LeadingEdge,2,Hill,4, TrailingEdge) and (FallingEdge,7,Valley,9,RisingEdge). Later, for simplicity we will concentrate only on those named and omit those merely numbered.

Operationally defining more features is possible but being cumbersome and not essential to the employment of the present embodiment, will not be done here. The basic Features described above are addressed below in software which detects, in the digitized signal Sig(M,*), the Feature at Sig(M,Tick), for the types of features illustrated above. This software can work on signals which are more complex than examples herein and which contain noise. Computer code, or pseudo code, illustrating the basic idea is described below.

Suppose a digitization yields points (T,f(T)) of some signal in time, where T is a tick, a value of a tick-counter. Some popular procedures for extracting information from such a signal are diffuse, based as they are upon assumed but unattainable continuity of functions. They involve summations, analogous to "integration" of Calculus and perform such calculations over intervals of the time domain of the function which are, typically, much longer than the period of some presumably relevant oscillation. Some words relevant to some such diffuse procedures and not used here are correlation, spectrum, broad-band, filter, inverse, wavelet, convolution, phased array, beam-forming, beam-steering, Radon transform, Laplace transform, Fourier Analysis, filter, and frequency domain. Such classical procedures seem relatively time-costly and are mentioned only to contrast sonarscopy with the current state of the art.

Sonarscopic procedures presented herein were all created by the present inventor who has no knowledge of similar prior art. They extract information from a time-series, a sequence of points (T,f(T)), and they are not diffuse but are instant-based, also called point-based, defined at a point in time, yet also they involve signal-crossing constructs (e.g. sigkey, below) based on a set of time-series output by a scopion. Point-based procedures are used to detect features by comparing a point (T,f(T)) with its neighbors, such as, for example (T+1,f(T+1)) or, more generally, (s,f(s)) where s is a tick that is near-enough, in some sense, to T and such that f has a particular feature at (s,f(s)).

The number of possible features is at least 2+SamplesPerClick. This example will proceed using just those six named previously as (LeadingEdge, Hill, . . . ) and are now renumbered from 1 through 6. Henceforth, NFeatures will be 6 in the exemplifications.

For each kind-of-feature F (integers 1 through 6), there is FeaturesDelay(F) for a slight correction in time, for which the following is a good first evaluation:

FeaturesDelay($F$)=2*(ClicksDuration)*($F$−1)/SamplesPerClick.

An instance in some Sig(M,*) of some Feature can be called a "feature-thing." When F denotes a Feature, a feature-thing of Feature F can be called an "F-thing." So, an instance of a Hill can be called a hill-thing.

Hit Detection

Suppose echoes come from a non gridpoint Q. These echoes might have "hills" at ticks whose times are q(1), q(2), and so forth, of the mikes, five being used in FIG. 7. In practice Q will be unknown, but will have a set of suggestive times q(M). Suppose, then, that P is a gridpoint near to Q, F is, for FIG. 7, the Hill feature and p(M)=to a(P,M)+FeaturesDelay(F). To increase the speed of execution, grid-based numbers p(M) can be precomputed and, in practice, read from memory. The numbers q(M) are provided via sensors. In FIG. 7, the distinct numbers p(M) are aligned along a vertical line for convenience in comparing the differences |p(M)−q(M)|.

The question then becomes how far does the set of echoes from Q vary from what would have been the set of echoes from P. In practice, a point Q is unknown, but Hills and other Features of a signal are known, as is the pre-computed p(M). Error(P) is now measured in taking P as the generator of the q(M). The differences |p(M)−q(M)|, which form the bases of various notions of error, will be referred to as sensor-specific toa-error, represented in code by the variable SensorsToaError(M).

Through theoretical guessing or simulation or experimentation, a positive number GridHitRadius is chosen, also denoted by GHR. Error(P) is "small-enough" when it is less than GridHitRadius. A detection-grid and a grids-hit-radius are used together in detecting "hits," entities which then form the image-model.

Each feature-thing, or instance of a Feature, in a digitized signal, a time-series from one of the sensors, will have its unique tick. A first step in processing scopic time-series Sig( ) will be, for each Sig(M,*) and each Feature F and every tick Tic, to find the tick of the nearest F-thing to Tic.

TickOfNearFeature( ) is the function defined thusly: for every triple (Feature F, mike-number M, tick Tic), TickOfNearFeature(F,M,Tic) is the nearest tick T to Tic such that the Feature of Sig(M,*) at (T,Sig(M,T)) is F. When there are two "nearest" ticks, the first is used.

The function PointKey( ) is defined by PointKey(F,P,M)=to a(P,M)+FeaturesDelay(F) for every Feature F, every mike-number M, every point P.

The PointKeys of gridpoints are pre-computed before the first click. After Click, TickOfNearFeatures( ) is used to populate an array which is subsequently used in detection of instances of "signal-crossing constructs" such as pointkeys. The statement that p( ) is a pointkey means that p( ) is an NMikes-termed sequence such that for some Feature F and some point P, p( )=PointKey(F,P,*); so, for each M, p(M) is the time PointKey(F,P,M). F is called the Feature of p( ) and P is called the Point of p( ).

More formally than before it is now stated that if F is a Feature then by a sigkey of Feature F is meant a sequence q( ) such that every mike-number M, q(M) is the time of a tick Tic such that the Feature of Sig(M,*) at Sig(M,Tic) is F.

Recapitulating: the terms p(M) of a pointkey p( ) come, not from ticks of a signal, but are computed from times-of-arrival from a hypothetical point in physical space. The terms q(M) of a sigkey q( ) are times derived from ticks of a time-series (a digitized "signal").

In practice, it is not generally known that a sigkey q( ) came from some point P. Each q( ) will be implicit in Sig( ) and most will not have some associated point P. The sequence PointKey(F,P,*) does not come from a real, scopic time-series as output by a set of sensors, and is computed from a possible reflecting point and can be used to specify a particular sigkey q( ) and associate q( ) with the point P.

If F is a Feature and P is a point of TargetZone then by the sigkey of F and P, denoted by Sigkey(F,P) is meant the NMikes-termed sequence q such that for every integer M from 1 to NMikes, if T abbreviates TickOf(PointKey(F,P,M)) then q(M)=TimeOf(TickOfNearFeature(F,M,T)).

A precise notion of "error," a kind of distance between a sigkey and a pointkey of a gridpoint, P can now be appreciated.

Suppose 1) P is a point, F is a Feature, and q( ) is a sigkey of Feature F, 2) for each mike-number M, p(M)=PointKey (F,P,M) and D(M) denotes |p(M)−q(M)|, and 3) ToaError(F, P,q( )) is defined as the maximum, over all mike-numbers M, of D(M). Then, The "Error(P)" above is ToaError(Hill,P, q( )). In practice q( ) is found via p( ), from the Sig( ) of a sensorset after computing p( ), independently of Sig( ), from a point in TargetZone, possibly a gridpoint. The name "ToaError" can remind of differences in times of arrival of details (e.g. feature-things) of signals in a scopic time-series. The intrinsic toaerror of P with respect to F is ToaError(F,P, PointKey(F,M,*)).

When the context is clear, "hit" will be used rather than "scopichit." It may also be said that there is a hit of Feature F at a gridpoint P provided that ToaError(F, P,q( ))<=GridHitRadius for some sigkey q( ) of Feature F.

The software procedure which detects hits is referred to herein as HitDetector. A set of scopichits output by HitDetector is called an image-model. It will be seen that each hit has other useful properties in addition to its hit-point.

Images can be generated, or rendered, from an image-model. Each hit H in ImageModel has a point H.Point, a Feature H.Feature, and a toaerror H.Error. These can be used in rendering. For example, H.Point can be drawn as a large dot whose color is, via a user-alterable table, determined by H.Feature, and whose intensity is determined by H.Error.

Note that a ToaError 1) is "point-based," based on a point of the target zone, 2) uses a "feature" which is based on a point (T,Sig(M,T)) of the signal's time-series Sig(M,*) and 3) is a "signal-crossing construct," defined via a set of simultaneous signals or time-series from a sensor-set. ToaError is a first good example of a sonarscopic property.

There is more than one notion of error to choose from. ToaError(F, P,q( )) may be defined as the average, or "mean," over all mike-numbers M of the D(M) (or of $|D(M)|^2$), and this may be denoted by meanError(F,P,q( )) (by meansquareError).

Examining FIG. 7, it is seen that, in that example, meanError(F,P,q( ))<maxError(F,P,q( )) so that it might be the case that one of them is less than GHR and the other exceeds GHR. So, while not specifically disclosed herein, there may possibly be a practical difference in choice of measure of ToaError( ). An clear practical consideration for choosing a measure is time of computation.

To differentiate sensor-sets from other sets of sensors used differently by other people, the word "scopion" is used to refer to a sensor-set used Features, with signal-crossing constructs, or with other new art described herein. A sonarscope has at least one scopion. Beginning with a Click, there is an interval of time, TimeChunk, in which is produced all those signals to all the sensors in all the scopions which will lead to one or more image-models for that Click. In a typical imagined sonar application, TimeChuck is a sub-interval of the interval from the start of Click to the start of the next click.

For now, just one scopion, S, is considered. Each sensor M in S produces for TimeChuck, one time-series Sig(M,*). The set Sig( ) of all those time-series Sig(M,*) for all the sensors M in S is called the "scopic time-series of scopion S for TimeChunk." From a scopic time-series is generated various "signal crossing constructs" and their sonarscopic properties. Examples of such constructs are sigkey and pointkey, and of a sonarscopic property, ToaError.

Suppose for purposes of this application that in TargetZone there are exactly two reflecting objects and these are small spheres whose echoes do not overlap on any sensor. Assuming no other sources of energy, it is expected that, for each mike M, Sig(M,*) has exactly two hill-things. The number of signal-crossing sigkeys which can be made from those hill-things is 2 raised to the NMikes power. So, for NMikes=3, the number of sigkeys is 8, exactly two of which are "real" in that they correspond to real objects. Six of them are "phantoms." If NMikes=6 and there are ten reflecting spheres, then the number of phantoms can be as high as 999,990.

The Grid allows the detection of some sigkeys, among possibly millions, which are, probably, not phantoms but are probably associated in some way with real reflecting objects. For a Feature F and gridpoint P, the pre-computed PointKey (F,P,*) is used, as said earlier, to generate SigKey(F,P,*), call it q( ). If ToaError(F,P,q( )) is small enough in some given first sense then P is moved without further reference to the Grid, so as to reduce ToaError(F,P,q( )). If that error becomes small enough, in a second given sense, then that new point P and sigkey q( ) are joined, in software, in a scopichit. Upon passing further tests that hit can be added to the image-model of the scopion (else P is discarded).

Static and Dynamic Methods for Reducing TimeCost

TimeCost is a representative time, such as an average time, of computing an image. It is a common practice to increase the speed of a code-loop by computing, before the loop, quantities originally thought of as being within that loop. Similarly then, Sonarscopy has, peculiar to itself, opportunities for time-savings. Notable among these time-savers are:

1) computation of the PointKeys of Grid is done once and applied to every image-model; and 2) FeatureDetection which is done on each time-series Sig(M,*) in the scopic time-series Sig( ) before computing signal-crossing constructs.

A dynamic act, is an event which occurs or is allowed to occur in the software after the generation of one image-model and before the generation of the next. As a first step allowing dynamic allocation of computational resources, a TargetZone is covered with a set of range-zones RZ(1), RZ(2), up to RZ(NRZones).

Every range-zone is the intersection of the TargetZone with all the points lying between two spheres centered at the vertex of that larger zone. A range-zone Z has, for each mike M, the TimeZone of Z and M, consisting of those times at which echoes from points of Z might arrive at Mike(M). A biological range-zone is indicated in FIG. 1.

Sonarscopy has parameters which can be dynamically altered during run time, changing the performance of the system, typically either, 1) trading between speed and quality-of-image, or 2) altering appearances according to a user's desires (in the case that there is, in fact, a user).

Each member of the first category above is called a Dynamically Alterable Parameter, or dapar, and each member of the second is called an Appearance Parameter. The running program need not, for long, treat all range-zones equally. It can prioritize and focus, as seen below.

There is an adjustable parameter MinimumLoudness such that after each click, only signals from those range-zones Z for which some measure, ZoneLoudness(Z), exceeds that criterion are analyzed further. Loudness can be based upon "signal-strength" or as "signal-strength adjusted for range." There are other processes which can be truncated, perhaps to 0, in order to reduce TimeCost. The truncation can be automatic, based upon informed guesses made by programmers, or result from a user's alteration of parameters.

Detecting Features and Computing their Loudness

The sample code herein has entities similar to those which are called "Types" in a presently well-known computer programming language (Visual Basic). Assume there exists an array FThing( ), to be generated from a scopic time-series and whose terms are of a software type FeatureThing where:

```
{
Type FeatureThing has these properties
    Feature As Integer 'ID of a category of Feature. "1" might mean
    LeadingEdge.
    Tick As Long Integer
    Time As Real 'or "Single" or "float."
    Loudness As Real
    FLink( ) As Integer 'to be clarified
    Triple As Boolean 'below.
End Type
}
```

The concept of Feature will be further clarified not far below.

Please note that in regard to such coding:

```
{
    A variable FT can, before its use, be declared to be of type
FeatureThing by the code
        Dim FT As FeatureThing.
    Then, we can use the properties
        FT.Feature, FT.Tick, and so on.
    A variable, not assigned a value, has a default value suitable to its
type. So, initially, FT.Feature is zero.
}
```

If F is a Feature then a sigkey of F is a sequence q( ) such that for every mike-number M there exists a FeatureThing T of Sig(M,*) of Feature F such that, for each M, q(M)= TimeOf(T.Tick).

FeatureDetector is a set of computer subroutines which detects feature-things in signals. FeatureDetector has a subroutine GetFeatures( ) which operates on Sig( ) and outputs both the array FThing( ) of type FeatureThing and an array NumFThings( ) of type Integer.

For every Feature F and for every mike-number M, NumFThings(F,M) is the number of feature-things in Sig (M,*) of Feature F, and it will be true that for N=1 to NumFThings(F,M), FThing(F,M,N) is a FeatureThing, and FThing(F,M,N).Tick is a tick T such that the Feature of Sig(M,*) at (T,Sig(M,T)) is F, as seen below.

To simplify matters for purposes of this example, features have been limited to six: LeadingEdge, Hill, TrailingEdge, FallingEdge, Valley, and RisingEdge, abbreviated, where convenient, by fL,fH,fT, and fF,fV,fR. HillFeatures is the set of hill-features. In the simplification above, HillFeatures= (fL,fH,fT). ValleyFeatures is the set of valley-features—(fF, fV,fR).

It is a continued assumption that Click consists of one sine wave and SamplesPerClick is 8, though it is easy to define these six features so that SamplesPerClick can exceed 8 and all the code still run correctly, if slightly modified.

FeatureDetection is illustrated herein by showing pseudo code for detecting LeadingEdges and TrailingEdges. Instances of these two Features will be sought on either side of each detected Hill. The same code computes loudness of feature-things and applies a criterion MinimalLoudness( ) by which faint-enough feature-things may be ignored.

Above( ) is a function which may be used to determine if a third point is above the line through the first two: (T,Sig (M,T)), (T+1,Sig(M,+1T)), (T+2,Sig(M,T+2)).

```
{
Function Above(M,T) 'this is auxiliary code, used to support code for
some main ideas shortly below.
    'Where M is a mike-number and T is a tick.
    'The output is True or False.
    If Not (the numbers T,T+1,T+2 are in domain of Sig(M,*)) Then
        Above = False: Exit Function
    End If
    If
        the point (T+2,Sig(M,T+2)) is above
        the line containing (T,Sig(M,T)) and (T+1,Sig(M,T+1))
    Then
        Above = True
    Else
        Above = False
    End If
End Function
}
```

The function Above( ) will be used below in GetFeatures( ) to detect features of various kinds—of which LeadingEdges and TrailingEdges will be shown. Suppose, for example that FIG. 8 represents the entire signal for Mike(M). Points in that figure are of the form (T, Sig(M,T)) for time-ticks T and any given sensor M. It becomes clear then that:

Above(M,T1)=True

Above(M,T2)=False

Above(M,T5)=False

Above(M,T6)=True

Above(M,T8)=False

The Feature at (T5,Sig(M,T5)) in FIG. 8 is Hill. Finding hill-things seems apparent and its details are omitted.

It can be seen in FIG. 8 that:

FThing(fL,M,1).Tick=T2 '$1^{st}$ LeadingEdge

FThing(fH,M,1).Tick=T5 '$1^{st}$ Hill

FThing(fF,M,1).Tick=T7 '$1^{st}$ TrailingEdge

Valleys are essentially upside-down hills and their logic similar, so it may be assumed that facts about valleys are clear extensions of facts about hills.

It will be seen that every feature-thing T such that T.Feature is in the set HillFeatures either is, or is "linked to", a feature-thing H such that H.Feature=Hill; and H is called the hilltop of T. There is code which "links" feature-things to other feature-things that belong to the same hill (similarly done for valleys). So, for example, fL-things will be linked to fH-things (an "fL-thing" is an instance of the Type LeadingEdge).

The subroutine GetFeatures( ) performs these acts: For each sensor M, 1) Finds all hill-things, call them Hills, in Sig(M,*), 2) Uses Hills fH to find LeadingEdges fL, 3) Uses Hills to find TrailingEdges ff and then finds triples (fL,ff,ff), and 4) For each feature-thing finds its properties and stores them in the array, FThing( ), for rapid use later. For each mike-number M, the entities stored in FThing(*,M,*), including feature-things defined herein, are not thought of as instances of "signal-crossing constructs" but will be used to compute such things.

Subroutine GetFeatures( ) will begin at a hill-thing (or valley), and then will search for nearby and related featurethings. Various arrays are assumed to have been initialized to 0 or to null. Note that there is a number NS to limit how many, at most, neighboring ticks of a tick can be considered in our search. NS must be large enough, typically 10 being a sufficient figure. It is trivial to imagine code to find every Hill (every Valley) in a Sig(M,*). So, it is assumed that, before the code below, every Hill and every Valley has been detected and stored in FThing( ). More exactly, at least the Tick and Time of the Feature have been stored.

Next, in the code below, each Hill is used to seek a corresponding LeadingEdge and also a TrailingEdge—creating pairs of the schema (fL,fH) and (fH,fT) and triples of the scheme (fL,fH,fT):

```
{
Dim FL As FeatureThing, FT As FeatureThing, FH As FeatureThing, nullFT as
FeatureThing
For every mike-number M,
    ' Code, being obvious, is omitted here which detects every Hill, storing it in
FThing( ),
    ' and which produces NHills, the number of Hills of Sig(M,*), and produces,
    ' for every integer H from 1 to NHills,
    '  some properties of FThing(fH,M,H), notably Tick.
    minL = MinimalLoudness(fL,M) ' These 3 criteria are dapars for F-Squelch as
    minH = MinimalLoudness(fH,M) ' will be discussed later.
    minT = MinimalLoudness(fT,M)
    NumFThings(fH,M) = NHills
    L = 0 ' L is a counter.
    For H = 1 to NHills ' This loop uses fH-Things to detect fL-Things to link to.
        Tick = FThing(fH,M,H).Tick ' Found by earlier, assumed, code.
        T = Tick − 1' Begin searching backwards in time for a LeadingEdge.
```

-continued

```
        If Above(M,T – 1) Then Goto NextHill ' Failure at staff, go to NextHill, a label
below.
        For S = 1 To NS ' Look back no more than NS ticks.
            T = T – 1' Looking further back in time.
            If Above(M,T – 1) Then ' Success.
                FL = nullFT
                HowLoud = | Sig(M,Tick) – Sig(M,T) | ' A vertical line-interval at "T2"
                'in FIG. 9 illustrates this concept of "loudness."
                If HowLoud < MinL then Exit For     ' MinL is a dapar
                L = L + 1 ' Add this LeadingEdge to our array:
                NumFThings(fL,M) = L ' The number of fLs in the time-series for sensor
M, so far.
                FL.Feature = LeadingEdge ' fL
                FL.Loudness = HowLoud ' This loudness is a point-property of the fL and
fH of Sig(M,*).
                FL.Tick = T: FL.FLink(fH) = H ' Link from this fL to its fH.
                FL.Time = TimeOf(M,T)
                FThing(fL,M,L) = FL
                FThing(fH,M,H).FLink(fL) = L ' Reciprocal link from its fH to this fL.
                FThing(fH,M,H).Loudness = HowLoud
                Exit For ' A basis has been detected for a link of the scheme (fL,fH).
            End If
'   FThing(fL,M,L) is the LeadingEdge of FThing(fH,M,H)
'   and FThing(fH,M,H) is the Hill of FThing(fL,M,L).
        Next S ' This is bottom of For-loop exited above via "Exit For."
    NextHill:
    Next H
    N = 0
    For H = 1 to NHills ' This loop uses fHs to find fTs and, so finds pairs of
scheme (fH,fT) and triples.
        FH = FThing(fH,M,H) ' Assumed to have been found in "trivial" code.
        Tick = FH.Tick
        If Above(M,Tick) Then Goto SkipHill
        T = Tick
        For S = 1 To NS' Look ahead no more than NS ticks.
            T = T + 1 ' Seeking forward in time
            If Above(M,T) Then
                FT = nullFT ' clears all properties of FT.
                TT = T + 1
                HowLoud = | Sig(M,Tick) – Sig(M,TT) |
                If HowLoud < MinT then Exit For ' Jump past Next S below. MinT is a
dapar.
                N = N + 1
                NumFThings(fT,M) = N ' The number of fTs so far.
                FT.Feature = TrailingEdge
                FT.Loudness = HowLoud
                FT.Tick = TT: FT.FLink(fH) = H ' Link from this fT to its fH.
                FT.Time = TimeOf(M,TT)
                FThing(fT,M,N) = FT
                FH.FLink(fT) = N           ' Link from its fH to this fT.
                If FH.FLink(fL) <> 0 Then      ' Triple might exist. Let's see:
                    HowLoud =
                        {the larger of HowLoud and
                            FThing(fL,M, FH.FLink(fL)).Loudness}
                    If HowLoud >= MinH then ' Triple exists.
                        FH.Loudness = HowLoud
                        FH.Triple = True      ' A triple of the scheme (fL,fH,fT) has been
detected.
                        FThing(fT,M,N).FLink(fL) = FH.FLink(fL) ' Link from fT to fL of
same fH.
                        FThing(fT,M,N).Triple = True
                        FThing(fL,M,FH.FLink(fL)).Triple = True
                        FThing(fL,M,FH.FLink(fL)).FLink(fT) = N ' Link from fL of fH to
this fT.
                    Else
                        ' No triple of the scheme (fL,fH,fT).
                    End If
                End If
'   FThing(fT,M,N) is the TrailingEdge of FThing(fH,M,H) and
'   FThing(fL,M,H) is the hill of FThing(fT,M,N).
                FThing(fH,M,H) = FH
                Exit For
            End If
        Next S
```

-continued

```
SkipHill:
  Next H
  ' Code is omitted here which, in a way similar to that above
  'detects links of the schema (fF,fV), (fV,fR), (fF,fV,fR).
Next M
}
```

Definitions of the LeadingEdge and of the TrailingEdge of a hillthing are embedded in the preceding code. Similar definitions can be easily created for FallingEdge and RisingEdge of a valleything.

Next, FThing( ) is used to compute an array Near-FThing( ) which is good for rapidly searching a time-series for feature-things. NearFThing(F,M,Tick) points to the feature-thing of kind F, in the signal of Mike M, whose tick is nearest to Tick (or points to the first of two, left and right, equally near):

```
{
Given F, M, and Tick, we find in Sig(M,*) the F-thing whose tick is
nearest to Tick:
T = FThing(F,M,1).Tick : min = | T − Tick |
IndexToNearest = 1
For N = 2 to NumFThings(F,M)
  T = FThing(F,M,N).Tick
  If min > | T − Tick | then
    min = | T − Tick |  ' T is TickNearest
    IndexToNearest = N
  End If
Next N
NearFThing(F,M,Tick) = IndexToNearest
}
{
Type Point
  X As Real
  Y As Real
  Z As Real
End Type
}
```

Given the code
Dim P As Point, the expressions P.x, P.y, and P.z are then meaningful.

KeysIndexes and FeatureKeys

The concept of "FeatureKey," is indicated by this command: "For some Feature F, generate a sequence by, for each sensor M, picking from the output of M one feature-thing whose Feature is F. A FeatureKey is a signal-crossing construct.

There is now this definition: if F is a Feature then the statement that Ky is a KeysIndex for F means that Ky is a sequence of positive integers and the number of terms of Ky is the number of sensors in the sensorset and each term Ky(M) of Ky is an integer from 1 to NumFThings(F,M).

Suppose that in TargetZone there are exactly two reflecting objects and these are small spheres whose echoes do not overlap on any sensor. Assuming no other sources of energy, it is expected that, for each mike M, Sig(M,*) has exactly two Hills. In case NMikes=3 then the number of KeysIndexes is 2*2*2=8 and KeysIndex (1,2,1) can be used to refer to the sequence (1st Hill in Sig(1,*), 2nd Hill in Sig(1,*), 1st Hill in Sig(3,*)). If the KeysIndex (1,2,1) corresponds to one of the spheres, it is expected that (2,1,2) corresponds to the other and the other six KeysIndexes are phantoms, corresponding to no reflecting object.

If Ky if of the new Type, below, called FeatureKey then 1) Ky will have a Feature Ky.Feature, call it F, and 2) Ky will have a KeysIndex such that, for each M, if J=Ky.KeysIndex (M) and T=FThing(F,M,J).Tick then Sig(M,T) will be of Feature F, and 3) various other properties will be packaged with Ky.

A FeatureKey is based upon its KeysIndex and its array FThing( ) of FeatureThings:

```
{
Type FeatureKey
  Feature      As Integer
  KeysIndex ( ) As Integer    'An NMikes-termed index into
  the computed array
  FThing( ) of FeatureThings of Sig( ).
    FThing( )       As FeatureThing ' For each M, each item is a copy
    taken via
  KeysIndex from the array FThing( ).
    LinkedToHit( ) As Integer   ' Is used in ImpliedHits, below.
    Loudness   As Real    ' a property of a signal-crossing construct.
    Tier       As Integer   'Tier derives from Loudness, much later in this
    document.
    Triple       As Boolean 'Triple exemplifies "linking scheme."
End Type
}
```

The Type called FeatureThing will be used mainly within the Type called Hit, as seen in subroutine HitDetection below.

If F is a Feature then the statement that K is a ScopicKey of F, or K is an F-Key, means that K is an NMikes-termed sequence such that for each, K(M) is a FeatureThing of Sig( ) and the Feature of K(M) is F.

If K is an instance of FeatureKey and the sequence q( ) is defined by q(M)=K.FThing(M).Time for every mike-number M then q( ) is a sigkey of Feature K.Feature, and is called the sigkey of the FeatureKey K.

In practice, the FeatureKeys K will have this property: if r( ) is the sequence defined by r(M)=FThing(K.Feature, M, K.KeysIndex(M)).Time for every mike-number M, then r( ) is the sigkey of the FeatureKey K.

Some properties of a FeatureKey come from similar properties of feature things. For example, Loudness of a FeatureKey Ky will be a property of a signal-crossing construct which will be computed from the Loudness of the features of Ky on the various Sig(M,*).

HitDetection

Code has been written which detects, jointly on the sensors of the scopion, entities called hits.

```
{
Type Hit
  Key As FeatureKey
  Point As Point
  Error As Real ' Computed from sigkey and pointkey.
```

-continued

```
' Other properties will appear later.
End Type
}
```

If H is a hit and K is defined by K(M)=H.Key.FThing(M) for every sensor-number M, then the sequence q defined by q(M)=K.FThing(M).Time for every such M is a sigkey, "the sigkey of H."

A subroutine, HitDetector, which contains the code:

```
{
Dim H As Hit, Key as KeysIndex
Dim Ky as FeatureKey
For every Feature F 'in some list which can be shortened by a dapar.
    ' Please review FIG. 7 in which F = Hill.
    For every gridpoint P ' in some range-zone
        For every mike-number M
            p = PointsKey(F,M,P) ' p is "p(M)" of FIG. 7.
            Key(M) = NearFThing(F,M,TicksOf(p)) ' a pointer into array FThing( ).
            FT(M) = FThing(F,M, Key(M)) ' a FeatureThing
            q = FT(M).Time
            D(M) = | p − q |     'ErrorAtMike(M) aka SensorsToaError(M)
        Next M
        E = D(1)
        For every mike-number M
            If E < D(M) then E = D(M) 'Our exemplifying, Measure of Error
        Next M
        If E <= GHR Then    ' The GridHitRadius criterion is met.
            NHits = 1 + NHits      ' Build the next hit:
            H = nullHit: Ky = nullFeatureKey    ' Clear these type-things of prior values.
            For every mike-number M ' * see note below
                Ky.Key(M) = Key(M)
                Ky.FThing(M) = FT(M) ' which is FThing(F,M, Key(M)),
                from above.
            Next M
            Ky.Feature = F
            Ky.Loudness = Loudness(Ky)
                    'Loudness( ) is a function shown shortly below.
            Ky.Tier ' computed here, based upon Key.Loudness as much later in this
document.
            H.Key = Ky
            H.Point = P
            H.Error = E
            ' Other properties of a hit explained later can be given values here.
            Hits(NHits) = H
        End If
    Next gridpoint
Next Feature
'* Redundancy placed into code to make later examples
' easier to read or to make later code run faster.
}
```

For a hit H, H.Point begins as a gridpoint, but, later, HitImprover will hold H.Key constant and move H.Point while reducing H.Error.

Differing distinctly from other methods for obtaining information from signals, sonarscopy (a term coined herein) uses:

1) features of signals which are geometric and local to the vicinity of a point (T,signal(T)) of a time-series of a signal;

2) signal-crossing constructs which intersect, or "cut across" the time-series of a set of time-series;

3) a sensorset which provides, via analog to digital conversion, the set of time-series and which has geometric specifications (not yet discussed); and 4) criteria for selecting among prospective parts ("hits") of image-models and also methods for improving them.

The hits detected by HitDetector, above, are preliminary hits, or proto-hits, to which selective criteria will be applied. The properties used to define such criteria constitute hit-support; and, for a given hit H, the values of those properties for H constitute the support of H.

Hit-support can be used to eliminate some hits—presumably ones which either waste time (as in redundancy) or which actually would, if used, detract from the quality of an image. For example, there is a dapar MaxAllowedHitError, such that a hit H is deleted before rendering if H.Error exceeds MaxAllowedHitError.

A subset, selected on the basis of hit-support, of a set of proto-hits is packaged, by running software, as the hits of an image-model which can be rendered into an image—using Point and other properties of Hits and properties of the FeatureKeys of Hits such as Error, Feature, Loudness, and Tier.

As seen, the feature-things of a time-series from one sensor, can be detected in pairs or in triples. Later will be seen, for hits, that other schemes than pairs and triples are possible. A Hit can be said to have hit-support based upon a scheme called hit-triple:

```
{
Ky = H.Key
    Ky.Triple = True
    For every mike-number M
        If Not Ky.FT(M).Triple then ' See, in GetFeatures( ), "A Triple of the scheme
(fL,fH,fT) has been detected".        Ky.Triple = False
            Exit For
        End If
    Next M
'H is said to be in a hit-triple if H.Key.Triple = True
}
```

Note that "triple" in GetFeatures( ) was a within-signal construct and hit-triple is a signal-crossing construct. Hit-triples can have virtue in rendering as seen below.

It has been observed through simulations that some proportions (~10%) of phantom-hits are triples and some much larger proportion of seemingly good hits are triples. So, demanding that the support of hits includes the property Triple seems effective in eliminating phantoms. But, since this is not certain, the tuning of this support can be left to a user via a dapar.

To reduce phantoms resulting from noise, HSquelch is used, which is based on the signal-crossing property Key-Loudness. It may be assumed that the natural reduction in loudness with range has been compensated for in Sig( ).

```
{
Function Loudness(Ky)
'Input Ky is a FeatureKey
'Output is a number (Real)
    There is more than one way to compute signal-crossing Loudness of FeatureKeys from Loudness of feature-things. To illustrate two ways, suppose that Ky is a variable of type FeatureKey and Ky.FThing( ) as been evaluated and F = Ky.Feature.
    1)    Define Ky.Loudness to be the maximum of the numbers Ky.FThing(M).Loudness for all mike-numbers M.
        Or,
    2)    Define Ky.Loudness to be the average of the numbers Ky.FThing(M).Loudness for all mike-numbers M.
    These two examples of definition of Key-Loudness are based upon the
```

-continued sensorset whose sensors M were used to detect the FeatureKey Ky.
End Function
}

Hit.Key.Loudness, computed from properties of hits and FeatureKeys, is a concept of sonarscopy, distinguishing sonarscopy from prior art.

Elements of the hit-support of a hit H include H.Loudness and H.Error. Also included are relations which H has with other hits, such as: whether or not H is in a feature-based linkage group (e.g. a Triple); and whether or not H is in a sensorset-based linkage group (to be seen later). These and other various elements of hit-support for a hit H can be combined into a measure (in various ways) and that measure be used for determining inclusion or rejection of H in image-rendering and, if rendered, in sizing, tinting, shading and in other graphical methods. Another application, than imaging, could be in object-classification.

If H is linked to other hits then measures of Loudness and Error of those other hits can be added to the mix (to, for example, some weighted average of items of support).

HSquelch is a dapar which is adjustable, automatically or by a user, and is such that if Hits(K).Key.Loudness<HSquelch then the hit Hits(K) is not used in the final image. Decreasing HSquelch can, in some circumstances, decrease TimeCost and reduce phantom-hits, but can also reduce the number of non-phantom hits, decreasing the quality of an image. One may presume that, in the embodiment of an imager of fish, whether a user is viewing isolated fish or a school of many fish will influence the user's setting of HSquelch.

Real Error

RealError(P), the real error of a point P, is the distance from P to that point of a real, echoing object, which is nearest to P. The real error of a set of points, its total error, is the average of the real errors of those points. Real error is not accurately known outside of simulations and, while not a fully accurate concept, can be useful in preliminary thinking.

Phantom Reduction Via Overlap Detection

A phantom is a hit whose Point has a noticeably (subjectively) "large" real error—it is far from any real, echoing object. But images have been observed, in simulation, which have had phantom-hits whose Error was less than that of most seemingly honest hits; so, items of hit-support, in addition to Error, have been provided as part of this invention.

Increasing the number of sensors in a scopion reduces the number of phantoms by making less likely alignments-on-all-mikes which are spurious, totally coincidental. But increasing the number of sensors increases TimeCost.

Sonarscopy provides software tests which greatly reduce the incidence of phantoms. The code here reduces phantoms but is, itself time-costly:

```
{   For J = 1 to NHits − 1
    KyJFT = Hits(J).Key J.FThing ' an array
    For K = J + 1 to NHits
        KyKFT = Hits(K).Key.FThing ' an array
        Overlap(J,K) = False
        For every M
            If KyJFT(M).Tick = KyKFT(M).Tick Then
```

-continued

```
                Overlap(J,K) = True: Exit For
            End If
        Next M
      End If
      Next K
    Next J
}
```

Two hits H and K are said to overlap each other if there exists at least one sensor M such that the Tick of H in the output of M is the Tick of K in the output of M.

When two hits overlap in simulation then, usually but not always, at least one of those two hits seems to be a phantom. For overlapping hits, the support of one hit is compared to the support of the other and the poorer can be deleted. The preferred support-property to use is Error, but, it has been established in simulations by the inventor that other sonarscopic hit-properties contribute nicely to phantom-reduction.

Hit-Improving

HitImprover is a procedure which can use gridpoints to detect hits whose Points are not gridpoints. The output of HitDetector includes ImageModel, a system of hits which, naturally, includes a set of points in Three Space, not necessarily on the Grid. This procedure uses a function which measures the intrinsic error of a hit which is based on the discrepancy, on each sensor, between the hit's sigkey and pointkey. This function is suggested by the following short example:

```
{
Function ErrorOfPointReHit(P,H)
    'P is of type Point, H is of type Hit.
    Ky = H.Key
    F = Ky.Feature
    For every mike-number M
        q(M) = Ky.FThing(M).Time ' q is the sigkey of H.
    Next M
    ErrorOfPointReHit = ToaError(F,P,q( ))
End Function
}
```

For each proto-hit H, output by HitDetector, H.Point is used as the first value of point "P" in an iterative process which searches in a vicinity of the current value of P for a point Q of less error than P; and when Q is found, replaces P with Q (in code simply: P=Q). The process requires a stopping criterion and one is described which is a new method within sonarscopy in that it depends upon the invented sonarscopic entity called "Hit."

First, a positive number ErrorStopCriterion is selected. The iterative process can be stopped when the sonarscopic entity ErrorOfPointReHit (P,H) is less than ErrorStopCriterion, if it has not already stopped when the number of iterations reached MaxIterations Both ErrorStopCriterion and MaxIterations are dapars.

HitImprover outputs a point P in 3-Space (usually in TargetZone) such that $$\text{ErrorOfPointReHit}(P,H) \leq \text{ErrorOfPointReHit}(H.\text{Point},H),$$

often much less, depending upon the coarseness of Grid. After improving is finished, H.Point is set equal to P and H.Error is set to ErrorOfPointReHit(P,H). Other possible measures of hit.Error are fairly apparent in light of this disclosure.

It is an assumption, substantiated in simulation, that improving a set of hits, by reducing hit.Error, improves an image.

A hill-hit can have a LeadingEdge-hit as a kind of "neighbor," defined via FeatureKeys of hits.

```
{
Function KeysNeighbor(K,G) As FeatureKey
    'Has input K of type FeatureKey and G, a feature-number and
    'outputs a FeatureKey, a kind of "G-neighbor" of K.
    Dim KN As FeatureKey
    F = K.Feature
    If G = F then KeysNeighbor = K: Exit Function
    For every mike-number M
        KFT = K.FThing(M)
        LG = FThing(F,M,KFT).FLink(G)
        If LG = 0 then return null
        KN.Key(M) = LG
        KN.FThing(M) = FThing(G,M,LG)
    Next M
    KN.Feature = G
    KN.Loudness = Loudness(KN)' See Function Loudness( ).
    ' Properties of KN, not set, default to a null value appropriate to its
    type.
    KeysNeighbor = KN
End Function
}
```

KeysNeighbor( ) enables an improvement in the search for hits. The number of Features used in initial HitDetection can be small and Hits of the other Features can be inferred later. Rather than doing this "for each gridpoint P and every Feature F consider whether P leads to a hit," instead, do this "for each gridpoint P and only the Features Hill and Valley consider whether P leads to a hit"—at one third the Time-Cost. Next, the hits are augmented by adding to each Hill-hit and each Valley-hit whichever of its "neighbors" satisfy some criteria. Fewer phantoms are generated this way—and time is saved in not having to detect and remove them.

Implied Hits and Feature-Based Linking.

Using a sparser grid, or using a GHR which is too small for the Grid, both decrease TimeCost. Some hits are apparently lost by these two methods. Some of these implied hits, which are implicit in the data but not detected by HitDetector, can be retrieved by using the method of ImpliedHits.

A lostkey is a FeatureKey K for which there exists an, as yet, undetected point P such that K and P constitute a hit. A lostkey implies a hit which can, perhaps, be detected.

The same code which detects implied hits also links some hits into pairs or larger units by means of the FeatureKeys of those hits. There is the previously listed but unused property of Type FeatureKey called LinkedToHit( ) which is a sequence each term of which is an index of a term of Hits( ). Hits will, via that sequence, be linked to hits. By demonstration in code below, feature-linked pairs are defined. Feature-linked triples are discussed below the code below. Larger units can be inferred.

Function IsOld(H), not listed here, compares a given hit H to all terms of Hits( ) detected so far and returns J if J is found such that Hits(J)=H and returns 0 if no such J is found. Code, for ImpliedHits, as indicated below, finds lostkeys and makes new hits from them:

```
{
Dim HG As Hit
For K = 1 to NHits,
    H = Hits(K): Ky = H.Key: P = H.Point: F = Ky.Feature
    For every feature-number G ' numbers 1,2, . . . ,6 in our model of
    illustration.
        ' For example, in our (fL, fH, fT; fF, fV, fR) model,
        ' if Ky.Feature = fH then G can be fL or, for triples, fT.
        HG.Key = KeysNeighbor (Ky, G) ' A new, implied hit, HG, is
        constructed:
        If HG.Key.Feature = 0 Then
            'In this case, HG.Key was not created by KeysNeighbor( ).
            Goto NextG
        End If
        J = IsOld(HG) ' J is an index to an existing hit.
        If J > 0 then ' HG is already in Hits( ), link it:
            Hits(K).Key.LinkedToHit(G) = J
            Hits(J).Key.LinkedToHit(F) = K
            ' Exemplifying with fH and fL,
            ' Hit # K of Feature fH would be linked (reflexively) to
            ' Hit # J of Feature fL.
        Else ' HG is an implied hit:
            HG.Point = P ' this initializes a search for a good enough point P.
            Call HitImprover(HG)
            If HG.Error < ErrorStopCriterion Then
                NHits = 1 + NHits    ' Accept the new hit.
                HG.Key.LinkedToHit(F) = K ' Link it.
                Call FillInBlanks(HG) ' gives values to other properties.
                Hits(NHits) = HG
                Hits(K).Key.LinkedToHit(G) = NHits
            End If
            ' Let I be the found or the new hit if it exists, then
            '(H,I) exemplifies a feature-linked pair.
            'of the scheme (F,G).
        End If
    NextG:
    Next G
Next K
}
```

Under the example wherein NHillFeatures=3 (same for NValleyFeatures), it is easy to understand a process of the linking of hits into structures which have more than two hits. A hit-triple is a triple (A,B,C) whose terms are three distinct hits and such that each pair (X,Y), whose distinct terms are in that triple, is a feature-linked pair as indicated in the code above. There clearly can be a feature-scheme of length other than three.

The statement that a sequence (F1, F2, . . . , Fn) is a feature scheme means that the terms are n distinct Features (e.g. for n=3, fL,fH,fT) and there is a list (p1, . . . , p(n−1)) where p1 is a process for linking an F1-key to an F2-key and p2 is a process for linking an F2-key to an F3-key, and so on.

Feature-linked pairs and feature-linked triples are examples of hit-linkage units. Particular feature-schemes, such as (fL,fH), are selected for linking of hits into pairs, and others for linking into triples such as (fL,fH,fT)—as feature-things were linked into pairs and triples by the code GetFeatures. In code and its comments shown above for illustration, these schema: {(fL,fH)} and {(fH,fT)} were exemplified.

A triple-scheme is of the form {(F,G), (G,H)}. The triple-scheme for (fL, fH,fT) is {(fL,fH), (fH,ft)}. A closed triple-scheme is of the form {(F,G), (G,H), (H,F)}. Many other schemas are possible.

Suppose (f1,f2,f3) is an instance of a feature-scheme F=(F1,F2,F3). If the ticks (T1,T2,T3) of f1,f2,f3 are such that T1<T2<T3 and no other feature-thing has its tick between two of those three ticks then the sequence (f1,f2,f3) is called a family scheme and the members of each of its pairs, such as {f1,f2} are called schememates re F.

It has been observed in simulation, that many phantom-hits are not linked to other hits. This is a property of phantom hits which seems, statistically, to differentiate phantom from non-phantom hits. The differentiation is better in some echoing situations than others; so, a dapar is provided to allow more or less (3 levels of) emphasis on filtering by means of feature-links. This dapar has three settings having these effects in whether the point H.Point of a hit H is used in rendering:

1) no demand is made of H about links,
2) H must part of a feature-linked pair,
3) H must be part of a feature-linked triple.

Those three settings decrease, in the order listed, the number of phantoms in an image. A choice is given because, in some situations, reducing phantom-hits entails reducing the good hits of a fuzzy image.

Feature-linked pairs can be used in rendering an image in line intervals rather than in dots, and feature-linked triples can be used to generate facets (see FIG. 10). Facets can be used, in rendering, for visual effects having to do with simulated lighting.

One option to give to users is provided by a mapping of kinds of features to colors. An image can thus be rendered by drawing, for every appropriate hit H, the line interval from H.Point to K.Point for some hit K which is feature-linked to H. The color of the line can be the color to which H (or K) is mapped, or drawing half of the line in the color for H and the other half in the color for K.

Reducing TimeCost via Nesting of Grids

Considering the grids-hit-radius, GridHitRadius or GHR, which was introduced previously, it can be seen that decreasing GridHitRadius decreases the real error of the images and also decreases TimeCost. However coverage (roughly, the number of hits) decreases. The images lie more truly on a target but become increasingly sparse as GridHitRadius decreases while the detection-grid remains constant.

To improve the quality of the images, Grid's density or "fineness," its number of points per unit of volume, can be increased. However, eventually, at some GridDensity, it would be found that the number of points and their pre-computed time-of-arrival PointKeys exceed practical limits on the size of the memory of a computer; or, it may be found, that the time-of-computation is impractically long. On the other hand, making the detection-grid increasingly less dense results, eventually, in decreasing the number of hits.

There is a way to have, under some reflecting conditions, the best of a fine grid and a coarse grid. This is achieved by using a sequence of nested grids. Here, only two (more or less "rectangular") grids are considered, 1) a FineGrid; and 2) a CoarseGrid which consists of every $27^{th}$ point of FineGrid. That is, each point P of CoarseGrid is itself a point of FineGrid but the 26 neighbors of P in FineGrid are A) not in CoarseGrid and B) not neighbors of any other point of FineGrid.

HitDetector first uses CoarseGrid and a larger CoarseGHR and outputs a small set, call it CH, of hits which, if rendered, would lead to a sparse image. Next, the running code concentrates on selected regions of FineGrid around the points of CH. For each such coarse hit H, around the gridpoint H.Point, the 26 neighboring points on FineGrid are searched for hits using a smaller GHR, call it "FineGHR"; and, in some situations, the number of hits increases. The result is an image whose total real error is as low as that of FineGrid, and whose coverage can be as complete, but which is computed faster. The time of computation can sometimes be nearly as small as $1/27$ of the time that would taken were the entire FineGrid to be used.

The speedup (increased efficiency), in the case of a fish-finder, is more pronounced for, say, small isolated fish than for schools of fish. Many fewer points of FineGrid are ultimately used for one small fish—because many of the fine points are never considered, being rejected by virtue of rejection of their neighboring coarse point. Some previous definitions and procedures might now be re-written, making clear which Grid is being used; but, are clear and will not be.

Dynamic Allocation of Time Via Prioritizing and Parameter-Changing

There are, in sonarscopy, natural prioritizations which can be used to dynamically truncate procedures to reduce Time-Cost. Experimentation has led to the selection the following ordering of features: Hill, Valley, LeadingEdge, FallingEdge, TrailingEdge, RisingEdge ( . . . other features are possible).

To reduce TimeCost, that list can be dynamically truncated in a procedure, via a dapar, dropping all but some number of the leading features in that list. Or, the user might find in some situations, by experimenting with an AppearanceParameter, the first two features, alone (Hill, Valley), to give the most pleasing (perhaps least "blurry") images. Such an act by a user reduces TimeCost and frees up computational time for other uses.

There are potential applications of sonarscopes in which the demands of time can change. Imagine that one is imaging fish and, at one extreme, focusing on one slow moving fish and, at the other extreme, imaging several fast moving fish. A user may, in the least demanding situations, employ the most time-demanding tools for improving images; whereas, at the other extreme, images may be sparse. Our dapars can be used in automatic procedures to adapt between such extremes.

Somehow, by software default or software computation or user control, TotalTimeLimit is set. There then applies the goal of generating the next image-model in no more than that amount of time. As an example, assume there are N processes, P(1), . . . , P(N) which can be time-limited; and, for each, there is L(K), a shorter name for TimeLimit(K). Also present is TimeOfOverhead, over which there is no direct software-control. Given an estimate of TimeOfOverhead, L( ) is sought so that that, if TotalTime=L(1)+L(2)++L(N)+TimeOfOverhead then, TotalTime <=TotalTimeLimit.

Possible examples for P(1), P(2), and so forth are: FeatureDetection, HitDetection (including HitImproving) and Rendering. These three can each be subdivided.

A user may alter the value of HSquelch, as previously noted. As HSquelch is increased, the number of hits, but often mainly the number of phantom-hits, decreases. This is not favorable for reducing TimeCost since HitDetection already computed the hits which were later deleted. HSquelch is not as good in this respect as the dapar FSquelch.

As dapar FSquelch is altered up or down, so too are altered the numbers MinimalLoudness(F,M) seen earlier in GetFeature( ). Effects of altering that variable in that code are easy to infer. Raising FSquelch reduces, for every kind-of-feature F and every mike M, NumFThings(F,M), the numbers of F-features in FThing( ). These lost items are not available for HitDetection and this reduces TimeCost. Raising FSquelch frees up time for other dynamically adjustable processes. When one L(K) is reduced, others can be increased, under the given constraints on time.

A process which generates a series of images, one click after another, can use facts obtained from earlier images to better generate the next. For example, hit-support can be extended to include comparisons (of hits-now to hits before) in time. Range Zones can also be given weighted measures of merit. Hits which are relatively weak in other respects might gain in a weighting from being predicted by a motion-model using recent images. The range-zones can be sorted, before HitDetection based on a click, in descending order RZ(1), RZ(2), . . . , RZ(NRZones) of that measure of merit. The range-zones to which HitDetection is applied can be some initial part of that series—based on estimated Total-Time.

One basis to use in a measure of merit of range-zones Z can be Z.Loudness(Z)—somehow measured jointly on several sensors. One way to compute the Loudness of a range-zone, based upon echoes from the current as well as earlier clicks, is indicated below. But first, pseudo code roughly shows a way to compute the loudness of a range-zone based only on the time-series of signals arising from the echoes of just one click reflecting from that range-zone:

```
{
    Given a range-zone Z,
    'Let F1 denote the first feature in a list of them all.
    Max = FThing(F1,1,1).Loudness
    {
        For every kind-of-feature F, for every mike M,
            For every integer N from 1 to NumFThings(F,M)
                If max < FThing(F,M,N).Loudness then
                    max = FThing(F,M,N).Loudness
    }
    Z.Loudness = max
}
```

Next, range-zone Z's neighbors in both time and space contribute to a measure of loudness of Z.

Suppose: 1) for some integer J, Z=RZ(J), 2) N denotes some set of range-zones including both Z and some zones near to Z. 3) T denotes some set consisting of the current click-instance and some click-instances immediately prior to the current one, 4) for each R in N and each C in T, RZ(R).Loudness at click C is stored in L(R,C), and values are given to weighting coefficients w(R,K).

Then define: Merit(Z)=the sum of the products, for every R in N and every C in T, w(R,C)*L(R,C). Merit(Z) depends, then, on Z.Loudness and Loudness of the neighbors of range-zone Z, in time and in space.

The dapar NRZonesToUse can be computed from estimations of times-to-compute hits of range-zones. Only NRZonesToUse of the most meritorious range-zones will be used in generating the next 3D image-model.

AppearanceParameters

User-controllable parameters whose primary purpose involves the appearance (e.g. coloration) of rendered images are called AppearanceParameters.

For example, in controlling range-shading: for each color C there is a mapping from a range-zone being rendered to a set of intensities for color C. So, there are the numbers Near and Far, the distances to the nearest and furthest points under consideration. There are also LightestIntensity and DarkestIntensity, denoted, only for now, by I1 and I2. Dapars can allow a user to control the mapping from the interval [Near,Far] to [I1,I2], in a simple case, by altering I1 or I2.

The distinguishing elements of sonarscopy include properties of hits (or of the Key of a hit) which, as indicated so far herein, include Feature, Loudness, and Error. Each of these (and others) can be used to interact with standard graphical entities such as point, line, and facet (e.g. a triangular region). It is already observed that there are 3*3=9 categories of such interactions and rather than being described, they are suggested by an example below.

The geometry can begin with a hit.Point. Next, hit.Error can be used to emphasize less those points whose associated hits have larger Error. For example, an appearance parameter can alter a mapping from hit.Error to the size of a dot or thickness of a line. Hit.Key.Tier, which comes from hit.Key.Loudness, can be used for coloring, or shading, or for sizing dot or line—governed by a mapping which is altered via an appearance parameter.

Sonarscopic Colorization and Tiers of Hits

Sonarscopy provides tools enabling textbook procedures of three-dimensional (even stereographic) computer graphics to be applied to sonar imaging (also, radar, medical imaging, and abstractly similar fields). Those procedures can improve human understanding which comes from images of objects moving in three dimensions. Thus are invented graphical methods which are natural to the feature-based, signal-crossing HitDetection. These methods can create an image made of dots or an image made of lines (called links) or an image made of facets, as computer-time (TotalTime-Limit) allows.

Consider persistence of color patterns on an imaged object, as that object moves. Humans and other animals are used to this in ordinary vision—the white nose of an otherwise black cat remains white. It has been discovered through simulations of sonarscopic imaging that there is often some persistence of color patterns when the colors are based upon Hit.Key.Loudness (see below) or upon Hit.Key.Feature.

Colorization methods apply whether the image is rendered in dots, or in links, or in facets. Shading of colors, to indicate distance from "the eye," applies to all three; lighter red may mean nearer, darker mean red farther, from the "eye"—where red may denote a particular level (tier) of loudness.

Images which are made of dots can be enhanced in ways which use sonarscopy. One example is: while the color of a dot may indicate Hit.Key.Feature, the size of the dot may be proportional to Hit.Key.Loudness and be inversely related to Hit.Error, or the intensity of the color (changing thereby the contrast with the background) can in inversely related.

In the TieringHitsByLoudness procedure, hits are sorted into sets, called tiers, by the Loudness of those hits. NTiersOfHits, the numbers of tiers, is a dapar. Another dapar is NHitsPerTier. The first (the Loudest) NHitsPerTier hits are placed into the Tier 1, then the next NHitsPerTier Loudest hits are placed into the next tier, and so on for so long as there are both hits and tiers. If H is a hit then H.Tier (or H.Key.Tier) is the tier which contains H, unless no tier contains H, in which case H.Tier is null.

Colors may then be mapped to tiers, so that each Tier gets its own color, TierColor(Tier). Thus, given a hit H, the color used to represent H is the color of the tier, if any, which contains H.Loudness; that is, the color for H is TierColor (H.Tier).

Methods of shading exist in textbooks on computer-graphics. Once colors exist for an image, shading (dark to light) can indicate other physical properties such as range to "Eye" or such as intensity of reflected light at a simulated Eye from a simulated light-source, as based upon some surface properties of the imaged object.

Stereography

Stereography is natural to sonarscopy because the point set of ImageModel is already in Three Space and can, using some standard tools in computer graphics, be made for left-eye viewing and right-eye viewing.

Parallelization

The job of computing an image-model naturally divides into parallel processes, PP, which can be computed in parallel. In the extreme, each PP may have its own computer CPU. From experimentation, it has been observed that HitDetection is the most time-costly part of sonarscopy; so, a good basis for sub-dividing computation is one whose PPs subdivide HitDetection. Such PPs can be Range-zones: these have been introduced and their parallel nature is clear or Subzones of range-zones.

One range-zone may be divided, using boundaries which are parallel (roughly) to ZoneAxis, into sub-zones. These zones are naturally independent in the computing of their hits, though there might exist redundancies (easily reduced) on the boundaries. The hits computed for the subzones separately can be rapidly combined for image-rendering.

Scopions: the sonarscope can have more than one scopion whose independently computed image-models can be combined and compared (see "hit-support) in rendering.

Features: these are mutually independent in HitDetection and they (e.g. Hill and Valley) can be detected each in its own PP.

Virtues of Having More than One Scopion

While one can hope a sonarscope, as described so far, generates dots in 3D which are analogous to and as informative as the pixels in a picture on a computer-monitor, a visually pleasing density of dots seems impossible under the method as described here so far, restricted to one scopion.

For a given duration of click (in experiments-by-simulation, 1/100,000 of a second, wave length=0.6 inch, in sea water is typical), there has been observed a BoundOnFineness, a fineness of the Grid (roughly, "the number of gridpoints per unit of volume") beyond which increasing the fineness will not increase the number of dots in an image.

To see why there might be a BoundOnFineness, assume ClickPeriod has wavelength of 0.6 inch and consider a range-zone having a thickness (measured parallel to Zone-Axis) of 3 inches and containing a part of, for example, a fish which may be expected, given our vision-based imaging experience, to require hundreds of dots to represent. Whatever is wished, there will be, at each mike, no more than five full-cycle echoes which come back from that region from a one-cycle click. It might seem unlikely to generate, via just one scopion, a hundred accurate dots from five Hills and five Valleys in the changing pressure at each "ear" even if ten kinds of features are used. It seems that probably no more than 50 hits will ever be detected, under those assumptions—no matter how dense the Grid. On the other hand, our few "hits" are in 3D and generated from just one click, whereas many fish-finders, for example, generate points in 2D (and only get to two dimensions by a continuous clicking and motion of the sensor).

The average number of points per image can be increased by 1) using features in pairs and triples to form lines and facets; or 2) adding more scopions. The first method, using features, adds very little to TimeCost but tends to produce links and facets (e.g. triangles) which are small, while the latter, increasing the number of scopions, produces links and facets which cover targets better but which could, if not used cleverly, multiply TimeCost by the number of scopions. Fortunately, having more than one scopion creates the time-option of truncating some aspect of HitDetection. By truncating HitDetection via Loudness a reduction can be realized in (from being doubled) TotalTimeCost (the sum of the TimeCosts of the various scopions) while getting just as many, and higher quality, hits.

A sonarscope can have more than one scopion. The sample software has a type called Scopion which has various properties related to the number and position of sensors; properties include NHits and Diameter. There is a list, Sets(1), Sets(2), Sets(NSets) of items of type Scopion and representing the sonarscope's scopions. The property MyScopion is added to type Hit so that if H is a hit, Sets(H.MyScopion) is the scopion which HitDetector used when it detected H.

Telescopy and Microscopy: Range-Focusing by Diameter-Selecting

It has been discovered in simulation that by adjusting the sensing array, an image of a target at a range of 1000 feet can be as detailed as of a target at 100 feet, neglecting distortions due to the medium. So, this new system can be given telescopic capability. Similarly, the system can be given microscopic capability. As in the case of the lenses of telescopes and microscopes which use light, telescopic sonarscopes are large and microscopic sonarscopes are small.

One configuration, call it RegularPolygon, for our scopion of NMikes acoustic pickups is evenly spaced on a circle of some diameter D and such that the axis of that circle is nearly enough parallel to ZoneAxis.

For a given diameter D and a given ClicksDuration C, there seems, in simulations, to be a narrow zone of ranges (or, a "fuzzy interval" of ranges), BestRange(D,C), at which an image will have minimized real error and maximized coverage; or, more accurately, the clarity and coverage are judged by a human to be best.

BestRange(D,C) has properties: DepthOfField and Mid-Field. If Dp=BestRange(D,C).DepthOfField/2 and Mid=BestRange(D,C).MidField, then The BestRange is the interval from Mid−Dp to Mid+Dp.

It has been observed in simulation that as diameter D increases, BestRange(D,C).Mid increases; so, longer ranges require larger scopions. Suppose, for a given target T, that Q is the perceived quality of an image of T made using diameter=D. Then, if the range of T is increased (e.g., doubled), then a new diameter D2 can be found, greater than D, so that images of T at its new range and made using diameter=D2, has subjective quality about as good as Q.

In practice, for a given target, approximately the same quality of image can be obtained at two different ranges by correct choice of two diameters D. Consequently, sonarscopy implies both telescopy and microscope. One can have a sonic telescope by using large-enough diameters or a microscopy by using a small-enough diameter.

Having better performance over a larger interval of ranges can result from a sonarscope having more than one scopion and them having among them more than one diameter. The more scopions of the more diameters, the greater the range of ranges at which the sonarscope will have "clear vision."

SensorSet-Based Linking of Hits/Companions: of Sets, of Hits

In software there can have be a type like this:

```
{Type Scopion
    NMikes          As Integer
    Place( )        As Point ' has x,y,z
    Diameter        As Real
    NSetsLinkedTo   As Integer
    SetsLinkedTo( ) As Integer
    NHits           As Integer
    Hits( )         As Hit
    CenterOfMass    As Point
End Type
}
```

The properties MyScopion and Index are added to hit. The hits of the various scopions are stored in software in the array Sets( ). If H is a detected hit then H=Sets(H.MyScopion).Hits(H.Index). The code for HitDetector must be altered to give values to newly presented properties of hits, but this is straight forward and not presented here. A new property of type Hit, for which code is indicated below, is SLinks( ) which links a hit detected via one scopion to hits detected by other scopions.

Sonarscope has a collection of physical scopions whose software representatives are Sets(1), Sets(2), up to Sets (NSets), each of type Scopion, and to each Sets(J) is applied separately the previously described methods of sonarscopy. After each click, HitDetector generates Sets(J).NHits and Sets(J).Hits( ) for every scopion-number J. Our new notation will help define, and our software detect instances of, relationships among the hits of the various scopions.

The properties NMikes, Place( ), Diameter relate to physical properties of the scopion and refer to only one of many possible physical designs. NSetsLinkedTo and SetsLinkedTo( ) relate to connections in software among outputs of the physical scopions. These connections are constant during HitDetection; but, might be altered by dapars (dynamically alterable parameters).

If S is a scopion (a software entity of type Scopion) then S.NMikes is the number of sensors in S.

For every integer K from 1 to S.NMikes, S.Place(K) is a point in three-space which indicates the position of S (e.g. the centroid of S).

S.Diameter is the diameter of the circle (see an earlier working assumption) on which lie all the points S.Place(K).

S.SetsLinkedTo( ) and S.NSetsLinkedTo are explained below.

S.Hits( ) is an array consisting of all the S.NHits hits generated from echoes, on mikes of S, of the most recent Click.

After a click and after S.NHits and S.Hits( ) have been computed, the center of mass of the points S.Hits( ).Point is computed and stored in S.CenterOfMass.

Given a hit H and a set W of hits, there is a hit K in W whose point is nearest to H.Point. Clarifying this concept of nearest neighbor in a set of hit-points: If P is a point and W is any set of hits then Kumpan(P,W), the kumpan of P with respect to W, is the first member K of W such that if L is any hit in W, then Distance(P,K.Point)<=Distance(P,L.Point).

Notation relevant to the organization of the sensors is now introduced: Suppose NSets, the number of scopions, exceeds 1. Suppose each set Sets(J) is, in code, linked (whatever the basis for the linking) to at least one other:

For every integer J from 1 to NSets, if S is Sets(J) then, for every integer K from 1 to S.NSetsLinkedTo, S.SetsLinkedTo(K) is an integer, other than J, from 1 to NSets. The integer S.SetsLinkedTo(K) is an index from the set S=Sets(J) to another set in Sets( ). So, Sets(S.SetsLinkedTo(K)) is the Kth set to which S is linked. An echoscope exemplifying sensors belonging to more than one scopion is shown in FIGS. 11 and 12. Possible graphical results of linking scopions can be seen in FIG. 8.

Hits H can be organized into links and facets by means of the links from Sets(H.MyScopion) to other scopions. The usefulness of links and facets to rendering is suggested by FIG. 10. A set-linked hit-pair is a two-term sequence (H1, H2) such that H1 is a hit and, for some integer L, H2=H1.Set.HitsLinkedTo(L), as detected in code indicated below—Suppose I is an integer from 1 to Nsets:

```
{
S = Sets(I)
For J = 1 to S.NHits
    H1 = S.Hits(J)
    For K = 1 to S.NSetsLinkedTo
        J2 = S. SetsLinkedTo(K)
        S2 = Sets(J2)
        ' From among the hits of S2.Hits( ), one is chosen.
        D = S2.CenterOfMass − S.CenterOfMass
        P = H1.Point + D ' vector sum
        S.Hits(J).SLinks (K) = Kumpan(P, S2.Hits( ))
        'Let H2 denote that hit.
        'Then (H1,H2) is a scopion-linked pair of scheme (I,J2).
        ' also a scopion-based hit-linkage unit of scheme (I,J2).
    Next K
Next J
}
```

The statement that (I,J,K) is a set-linkage-triple means that, 1) I, J, and K are integers such that sets S1=Sets(I), S2=Sets (J), and S3=Sets(K) exist; and 2) there exist integers IJ and JK such that J=S1.SetsLinkedTo(IJ) and K=S2.SetsLinkedTo(JK). Stronger linkages also exist. For example, it can be additionally required that, for some integer IK, K=S1.SetsLinkedTo(IK).

Links and facets can be chosen from among kumpans in a number of ways. In perhaps the simplest, a link can be drawn, for every H, from H.Point to H2.SLinks(K).Point for every appropriate integer K. Links have produced, in simulations, pictures more pleasing to the eye than mere dots.

Sonarscopic Lighting

For Sonarscopic Lighting the software will model points of space called Eye and Light. Given three non-colinear points P, Q, and R, either it is true that Eye and Light are on the same side of Plane(P,Q,R) or it is not. A simple device of graphical lighting is to render brightly or darkly a three-cornered facet according as Eye and Light are or are not on the same side of the plane of that facet. Sonarscopic tools both in software and in hardware, can produce hits in triples giving access to a wide variety of existing tools of computer graphics.

The sonarscope, its physical and software details, may be arranged and operated so that the basic sonarscopic image-model, output for each scopion by HitDetector, has its points in natural triples PQR in at least two ways. Here is a review of some ways that the physical device and software of sonarscope can be such that hit-points of the ImageModel are arranged into facets having three corners each:

1) By Features. This applies to one scopion at a time. This can be explained by example. Using the features fL, fH, fT. Suppose K1 is an integer not exceeding NHits. Let H1=Hits (K1). Say, H1.Feature is fL. Let K2 denote H1.Key.LinkedTo(fH) and, H2 denote Hits(K2). Let K3 denote H2.Key.LinkedTo(fT) and H3, Hits(K3). Then PQR can be treated as a facet, where P,Q, and R are H1.Point, H2.Point, H3.Point.

2) By Scopions. The scopions of sonarscope can be organized in triples. The notion of kumpan provides one basis for selecting, for a first hit, a second and a third hit from two other scopions to form triples. Suppose (I,J,K) is a set-linkage triple. Let S1, S2, S3 denote respectively Sets(I), Sets(J), Sets(K). There exist integers IJ and JK such that J=S1.SetsLinkedTo(IJ) and K=S2.SetsLinkedTo(JK). For every appropriate integer L, if H1=S1.Hits(L) and H2=H1.SLinks(IJ) and H3=H1.SLinks(JK) then the points of (H1,H2,H3) may be taken as the corners of a facet and used in rendering.

Of the two methods of faceting above, 1) has the virtue of speedy computation, but does not always much increase coverage, and 2) has the downside of its contribution to TimeCost.

Example: Linking by Scopions

As an example to mentally solidify our new concepts: suppose:

1) three scopions of 6 mikes each;

2) the mikes are more or less coplanar;

3) some one number is the diameter of each of those scopions;

4) the mikes of each scopion are arranged evenly on a circle of that diameter (as in a previous example); and 5) the three hexagons so described overlap so that each two scopions have two mikes in common. This can be done in such a way that, rather than 3*6=18 mikes, the array has just 13 mikes by virtue of a method which uses the signal, from each of 4 mikes, in hit-detection for more than one scopion.

The sensors are more or less together in one plane W and for each of the sensor sets, its zone-axis is more or less perpendicular to W. Further, there is substantial overlap of the target-zones of the sensor sets. To illustrate a "set-to-set basis for linking," the names Sets(K) of the example's three scopions are shortened to S1, S2, and S3. In this example S1 is linked to both S2 and S3, S2 to both S1 and S3, and S3 to both S1 and S2 and define:

S1.SetsLinkedTo(1)=2, S1.SetsLinkedTo(2)=3
S2.SetsLinkedTo(1)=1, S2.SetsLinkedTo(2)=3
S3.SetsLinkedTo(1)=1, S3.SetsLinkedTo(2)=2

Code for simple, point to point, linking can now be indicated. After HitDetection runs, using the Sig( ) of the latest Click separately for each scopion, pair-wise and triple-wise linkage units can be created among points by running code like this:

```
{
    S1 = Sets(1)
    S2 = Sets(2)
    S3 = Sets(3)
    For K = 1 To S1.NHits
        H1 = S1.Hits(K)
        P = H1.Point
        H2 = Kumpan(P, S2.Hits( ))
        Q = H2.Point
        H3 = Kumpan(P, S3.Hits( ))
        R = H2.Point
        ' Some code here saves H1, H2, H3 or
        'P,Q,R in arrays.
        ' (H1,H2) and (H1,H3) are set-linked hit-pairs
```

```
        'and (H1,H2,H3) is a set-linked hit-triple.
        ' (P, Q) is a set-linked point-pair.
        'These linkages can be used by a rendering routine.
    Next K
}
```

This example exemplifies but does not exhaust possible facet-forming linkings among hits.

Sensor Multi-Loading

The sonarscopic Method of Multiloading Sensors consists of having one or more sensors belong to more than one sensor-set. But, for each sensor, FeatureDetection is done just once per click and, so, TotalTimeCost per sensor is lower than it would have been. The "coverage" of a target object will be better, ordinarily, the more scopions are in the sonarscope's Sensor Array. But, increasing the number of sensors increases TotalTimeCost. It is noticed that when sensors are allowed to be members of more than one scopion, the number of useful such sets can be increased faster than the number of sensors. Over the coming years, as time-costs of computation (a main limiting factor today) continues to fall, it is expected that for a constant Total-TimeCost, the number of sensor-sets which can be used will not merely increase but can be increased at an increasing rate.

The method of scopion-multisizing is like this: for some number D and some sensorgroup G, each scopion which has diameter less than D, select sensors from among the sets in G to form a new scopion S of diameter exceeding D. Such scopions S constitute a new sensorgroup G2. The desired effect of scopion-multisizing is scopion-multiranging: the best-range of S can exceed the best-range of each scopion in G.

Using a Subset of a Scopion

The section of code for computing hit-error, as presented so far, is based on all the sensors of a scopion. However, this code can be modified to ignore some number L of the sensors having the greatest sensor-specific toa-error, which error is represented by the code variable SensorsToaError. The number of sensors in the set less L can be enough for detecting hits. L can, of course, be 0.

Clusterings and Time-Sequences

Software methods exist in textbooks which can be enhanced by elements of sonarscopy to partition a set of hit-points of an image-model into "clusters." Such partitioning would, classically be based on proximity of points in space and be enhanced by methods of feature-linking and scopion-linking of hits. In application to, for example, "fish-finding," the hit-points originating from one of two fish will, usually, be clustered together and away from the hit-points of the other fish.

Clusters can be followed from image to next image in time. A time-sequence of clusters can be tested for consistencies which would indicate correctness of the clustering. Also such a time-sequence can be used for gathering evidence for classification of the physical objects (e.g. species of fish, kinds of aircraft) whose echoes presumably led to the clusters.

The output of HitDetector is an image-model which includes a set M of points in Three Space (or, in some applications, Two Space). The better the system operates, the better a model M represents one or more target-objects T. In the case, for example, of a "fish-finder," M implicitly contains information about the shape and, even better resolved in simulations so far, the size of T.

A sonarscope can receive signals which are not echoes but which are generated by target objects. For example, a sonarscope can, in some circumstances, pinpoint the source point of a gunshot. In the dark of night, it might pinpoint the position of a small UAV (unmanned aerial vehicle). As a target-object moves, producing a time-sequence of image-models, those image models can be compared to classified time-sequences produced from echoes of physical objects of known classification allowing the present target object to be put, with some probability of being correct, into one of the pre-existing classes. For example, a probable fish can be assigned to a probable species.

A possible implementation of some physical aspects of sonarscopy is illustrated in FIGS. 12 and 13. The device, in the preferred embodiment, a fish-finder, is for imaging-sonar. The frame which holds the sensors and clicker is shaped like a discus. In one face of the disk are 12 holes. At the base of each hole is a hydrophone. The holes make the sensors more sensitive in the direction of the sonar beam. In the center is a sonar transmitter-receiver C which is both a clicker and a sensor, much like an ordinary fish-finder's sonar device and is in a $13^{th}$ hole.

In this embodiment the sonarscope is a fish-finder. The discus structure holding the sensor array has a diameter of about 12 inches and a thickness of about 2 inches. It is sensitive at right angles to the plane of the face of the disk so, most likely, while its boat is moving, it would be edge-on to the flow of water, and, so, would be "looking" to the side or down, at right angles to that motion. Of course, this is just one of a large range of embodiments.

The holes holding the microphones are in the shape of truncated cones—with the axis being parallel to the Zone-Axis or, perhaps, all those in one scopion, aimed at a common point on that axis. For each hole, the angle of the opening of the cone of that hole is approximately the angle of the beam of the clicker. These holes reduce noise relative to signal.

Reconsidering the sensors in FIGS. 11 and 12, there are, among the outer-most nine, six which form a regular hexagon. This hexagon, call it S4, has diameter about 75% larger than the number which is the diameter of S1, S2 and S3. The BestRange of S4 is about 75% greater than that of S1.

This example has two MikesGroups (aka ScopicGroups), 1) the set consisting of sets S1, S2, and S3; and 2) the set whose one member is the set S4.

In all claims made about "rendering," the implication is not only about using image-models to produce images, but all other uses of those image-models which are created via distinguishing elements of sonarscopy. Further still, in the case where "sound waves" are replaced with "radar waves," "fish" can be replaced with "aircraft" for another application. A multitude of implementations and applications are thus readily apparent for this invention.

Further still, while the main examples used herein come from active sonar, it is appreciated that the elements and methods disclosed can apply to passive sonar, to radar, to ultrasonic medical imaging, and to other fields wherein time of arrival of signals to sensors of a set of sensors produces information mathematically similar to that used in explanations in this application for patent.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention claimed is:

1. A method for producing an image model of three dimensional objects comprising:
   a. measuring signals received from said objects in a scopic time-series;
   b. detecting instances in a signal of hits and keys; and
   c. mapping instances of said hits and keys into an image model.

2. The method of claim 1 further comprising converting said image model to a visual representation of said three-dimensional objects.

3. The method of claim 1 wherein said signals are passive wave energy.

4. The method of claim 1 wherein said signals are echoes.

5. A method for rendering images of three dimensional objects comprising:
   a. detecting sonarscopic hits received from said three-dimensional objects; and
   b. constructing an image based on said sonarscopic hits.

6. The method of claim 5 wherein said image is a two-dimensional image.

7. The method of claim 5 wherein said image is a three-dimensional model.

8. An apparatus for producing a scopic series for producing images comprising
   a. a scopion capable of detecting signals and outputting a scopic series;
   b. said scopion configured in a geometric configuration optimized to enhance sonarscopic detection.

* * * * *